United States Patent
Pandey et al.

(10) Patent No.: US 12,242,490 B2
(45) Date of Patent: Mar. 4, 2025

(54) INTENT DRIVEN DASHBOARD RECOMMENDATIONS

(71) Applicant: Tableau Software, LLC, Seattle, WA (US)

(72) Inventors: Aditeya Pandey, Malden, MA (US);
Arjun Srinivasan, Seattle, WA (US);
Vidya Raghavan Setlur, Portola Valley, CA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/588,145

(22) Filed: Jan. 28, 2022

(65) Prior Publication Data
US 2023/0244675 A1    Aug. 3, 2023

(51) Int. Cl.
*G06F 17/00*     (2019.01)
*G06F 7/00*      (2006.01)
(Continued)

(52) U.S. Cl.
CPC ........ *G06F 16/24578* (2019.01); *G06F 16/26* (2019.01); *G06F 16/287* (2019.01)

(58) Field of Classification Search
CPC ... G06F 16/24578; G06F 16/287; G06F 16/26
(Continued)

(56) References Cited

U.S. PATENT DOCUMENTS

| 6,426,740 B1 * | 7/2002 | Goto ........................ A61F 4/00 345/157 |
| 7,010,364 B1 * | 3/2006 | Singh ............... G05B 19/41885 702/179 |

(Continued)

FOREIGN PATENT DOCUMENTS

| JP | 2007-249354 A | 9/2007 |
| JP | 2008-217480 A | 9/2008 |

(Continued)

OTHER PUBLICATIONS

Office Communication for U.S. Appl. No. 16/732,027 mailed Jan. 17, 2023, pp. 1-5.
(Continued)

*Primary Examiner* — Pavan Mamillapalli
(74) *Attorney, Agent, or Firm* — Morgan, Lewis & Bockius LLP

(57) ABSTRACT

Embodiments are directed to intent driven dashboard recommendations. A plurality of collection specifications that declare visualization declarations may be provided such that each collection specification is associated with an author intent. And attributes-of-interest selected from a data source may be provided. A plurality of collections may be generated based on the plurality of collection specifications, the attributes-of-interest, or data from the data source such that each collection may include visualizations that may be based on the visualization declarations. A preference score may be generated for each collection based on the author intent, visualizations in each collection, or the attributes-of-interest. The plurality of collections may be classified based on the preference scores associated with the classified collections such that the classified collections may be displayed based on the preference scores.

20 Claims, 15 Drawing Sheets

(51) Int. Cl.
*G06F 16/2457* (2019.01)
*G06F 16/26* (2019.01)
*G06F 16/28* (2019.01)

(58) Field of Classification Search
USPC .......................................................... 707/734
See application file for complete search history.

(56) References Cited

U.S. PATENT DOCUMENTS

| | | | |
|---|---|---|---|
| 8,099,674 B2 | 1/2012 | Mackinlay et al. | |
| 8,589,811 B2 | 11/2013 | Gotz | |
| 8,983,994 B2 | 3/2015 | Neels et al. | |
| 9,335,911 B1 | 5/2016 | Elliot et al. | |
| 9,361,320 B1 | 6/2016 | Vijendra et al. | |
| 9,418,105 B2 | 8/2016 | Buchheit et al. | |
| 9,613,086 B1 | 4/2017 | Sherman | |
| 9,779,147 B1 | 10/2017 | Sherman et al. | |
| 10,460,332 B1 | 10/2019 | Kujat et al. | |
| 10,552,513 B1 | 2/2020 | Harkare | |
| 10,572,544 B1 | 2/2020 | Zhang et al. | |
| 10,572,804 B1 | 2/2020 | Hilley | |
| 10,572,859 B1 | 2/2020 | Evans et al. | |
| 10,572,925 B1 | 2/2020 | Roy Chowdhury et al. | |
| 10,592,525 B1 | 3/2020 | Khante et al. | |
| 10,642,723 B1 | 5/2020 | Krishnamoorthy | |
| 10,705,695 B1 | 7/2020 | Porath et al. | |
| 10,719,332 B1 | 7/2020 | Dwivedi et al. | |
| 10,775,976 B1 | 9/2020 | Abdul-Jawad et al. | |
| 10,929,415 B1 | 2/2021 | Shcherbakov et al. | |
| 10,963,347 B1 | 3/2021 | Chen et al. | |
| 11,074,301 B2 | 7/2021 | Williams et al. | |
| 11,232,506 B1 | 1/2022 | Zielnicki | |
| 2005/0134589 A1 | 6/2005 | Heer et al. | |
| 2006/0212145 A1* | 9/2006 | Singh ............... G05B 19/41885 | |
| | | | 700/83 |
| 2007/0136285 A1 | 6/2007 | Cormode et al. | |
| 2008/0168135 A1 | 7/2008 | Redlich et al. | |
| 2009/0105984 A1* | 4/2009 | Wen ........................ G06F 16/26 | |
| | | | 707/999.102 |
| 2011/0137850 A1 | 6/2011 | Mourey et al. | |
| 2011/0296309 A1 | 12/2011 | Ngan | |
| 2011/0302110 A1* | 12/2011 | Beers ..................... G16B 40/00 | |
| | | | 706/11 |
| 2012/0229466 A1 | 9/2012 | Richie et al. | |
| 2012/0233182 A1 | 9/2012 | Baudel et al. | |
| 2013/0091465 A1 | 4/2013 | Kikin-Gil et al. | |
| 2013/0103677 A1 | 4/2013 | Chakra et al. | |
| 2013/0204894 A1 | 8/2013 | Faith et al. | |
| 2013/0300463 A1 | 11/2013 | Gemmeke et al. | |
| 2014/0019443 A1 | 1/2014 | Golshan | |
| 2014/0032548 A1 | 1/2014 | Gilra et al. | |
| 2014/0059017 A1 | 2/2014 | Chaney et al. | |
| 2014/0074889 A1 | 3/2014 | Neels et al. | |
| 2014/0156223 A1 | 6/2014 | Toomre et al. | |
| 2014/0344008 A1 | 11/2014 | Gammage et al. | |
| 2015/0112894 A1 | 4/2015 | Lingappa | |
| 2015/0120732 A1* | 4/2015 | Nemery De Bellevaux ................ | |
| | | | G06F 16/285 |
| | | | 707/737 |
| 2015/0278214 A1* | 10/2015 | Anand .................. G06F 16/338 | |
| | | | 707/748 |
| 2015/0331575 A1* | 11/2015 | Fernandez-Ruiz ..... G06T 19/20 | |
| | | | 715/850 |
| 2016/0012129 A1* | 1/2016 | Rampson ............... G06F 40/103 | |
| | | | 707/722 |
| 2016/0034305 A1 | 2/2016 | Shear et al. | |
| 2016/0092408 A1 | 3/2016 | Lagerblad et al. | |
| 2016/0092576 A1 | 3/2016 | Quercia et al. | |
| 2016/0103908 A1 | 4/2016 | Fletcher et al. | |
| 2016/0196534 A1 | 7/2016 | Jarrett et al. | |
| 2016/0307210 A1 | 10/2016 | Agarwal et al. | |
| 2016/0307233 A1 | 10/2016 | Pan et al. | |
| 2016/0350950 A1 | 12/2016 | Ritchie et al. | |
| 2016/0357829 A1* | 12/2016 | Fung .................. G06Q 10/0639 | |
| 2016/0364770 A1 | 12/2016 | Denton et al. | |
| 2016/0379084 A1* | 12/2016 | Keahey ................. G06F 16/338 | |
| | | | 382/165 |
| 2017/0031449 A1 | 2/2017 | Karsten et al. | |
| 2017/0061659 A1 | 3/2017 | Puri et al. | |
| 2017/0069118 A1 | 3/2017 | Stewart | |
| 2017/0124617 A1 | 5/2017 | Spoelstra et al. | |
| 2017/0132489 A1 | 5/2017 | Simgi | |
| 2017/0140118 A1 | 5/2017 | Haddad et al. | |
| 2017/0154088 A1 | 6/2017 | Sherman | |
| 2017/0154089 A1 | 6/2017 | Sherman | |
| 2017/0220633 A1 | 8/2017 | Porath et al. | |
| 2017/0308913 A1 | 10/2017 | Chao et al. | |
| 2018/0004363 A1 | 1/2018 | Tompkins | |
| 2018/0032492 A1 | 2/2018 | Altshuller et al. | |
| 2018/0039399 A1 | 2/2018 | Kaltegaertner et al. | |
| 2018/0121035 A1 | 5/2018 | Filippi et al. | |
| 2018/0129369 A1 | 5/2018 | Kim et al. | |
| 2018/0210936 A1 | 7/2018 | Reynolds et al. | |
| 2018/0232405 A1 | 8/2018 | Samara et al. | |
| 2018/0267676 A1 | 9/2018 | Glueck et al. | |
| 2018/0285772 A1 | 10/2018 | Gopalan | |
| 2018/0343321 A1 | 11/2018 | Chang | |
| 2019/0012553 A1 | 1/2019 | Maruchi et al. | |
| 2019/0026681 A1 | 1/2019 | Polli et al. | |
| 2019/0043506 A1 | 2/2019 | Rivkin et al. | |
| 2019/0102425 A1* | 4/2019 | Obeidat ................ G06F 16/248 | |
| 2019/0108272 A1 | 4/2019 | Talbot et al. | |
| 2019/0129964 A1 | 5/2019 | Corbin, II et al. | |
| 2019/0130512 A1 | 5/2019 | Kuhn | |
| 2019/0179621 A1 | 6/2019 | Salgado et al. | |
| 2019/0188333 A1 | 6/2019 | Williams et al. | |
| 2019/0213608 A1 | 7/2019 | Ouyang et al. | |
| 2019/0339688 A1 | 11/2019 | Cella et al. | |
| 2019/0355447 A1 | 11/2019 | Barkol et al. | |
| 2020/0012939 A1 | 1/2020 | Hu et al. | |
| 2020/0019546 A1 | 1/2020 | Luo et al. | |
| 2020/0050636 A1 | 2/2020 | Datla et al. | |
| 2020/0066397 A1 | 2/2020 | Rai et al. | |
| 2020/0104731 A1 | 4/2020 | Oliner et al. | |
| 2020/0134545 A1 | 4/2020 | Appel et al. | |
| 2020/0233559 A1 | 7/2020 | Rueter et al. | |
| 2020/0250472 A1 | 8/2020 | Abhyankar et al. | |
| 2020/0250562 A1 | 8/2020 | Bly | |
| 2020/0311680 A1 | 10/2020 | Wahl et al. | |
| 2020/0320462 A1 | 10/2020 | Wang et al. | |
| 2020/0333777 A1 | 10/2020 | Maruyama | |
| 2020/0372472 A1 | 11/2020 | Kenthapadi et al. | |
| 2020/0403944 A1 | 12/2020 | Joshi et al. | |
| 2020/0410001 A1 | 12/2020 | Sarkissian | |
| 2021/0011961 A1 | 1/2021 | Guan et al. | |
| 2021/0019338 A1 | 1/2021 | Grampurohit et al. | |
| 2021/0019357 A1 | 1/2021 | Bennett et al. | |
| 2021/0049143 A1 | 2/2021 | Jacinto et al. | |
| 2021/0081377 A1 | 3/2021 | Polleri et al. | |
| 2021/0088418 A1 | 3/2021 | Sato et al. | |
| 2021/0110288 A1 | 4/2021 | Poothiyot et al. | |
| 2021/0133632 A1 | 5/2021 | Elprin et al. | |
| 2021/0194783 A1 | 6/2021 | Sinha et al. | |
| 2021/0313070 A1 | 10/2021 | Toyoshiba et al. | |
| 2021/0365856 A1 | 11/2021 | Mukherjee et al. | |
| 2022/0019947 A1 | 1/2022 | Mitelman | |
| 2022/0147540 A1* | 5/2022 | Rossi .................... G06F 3/0482 | |
| 2022/0317979 A1 | 10/2022 | Araujo Soares et al. | |

FOREIGN PATENT DOCUMENTS

| | | |
|---|---|---|
| JP | 2009-534752 A | 9/2009 |
| JP | 2017-174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Office Communication for U.S. Appl. No. 16/672,130 mailed Feb. 13, 2023, pp. 1-34.

(56) References Cited

OTHER PUBLICATIONS

Office Communication for U.S. Appl. No. 17/866,091 mailed Mar. 2, 2023, pp. 1-30.
Office Communication for U.S. Appl. No. 17/158,911 mailed Mar. 8, 2023, pp. 1-6.
Office Communication for U.S. Appl. No. 16/732,027 mailed Mar. 8, 2023, pp. 1-9.
Office Communication for U.S. Appl. No. 16/732,027 mailed Feb. 25, 2022, pp. 1-6.
Office Communication for U.S. Appl. No. 16/944,085 mailed Mar. 17, 2022, pp. 1-6.
Office Communication for U.S. Appl. No. 16/903,967 mailed Mar. 18, 2022, pp. 1-11.
Office Communication for U.S. Appl. No. 16/944,064 mailed Mar. 22, 2022, pp. 1-10.
Office Communication for U.S. Appl. No. 16/915,963 mailed Mar. 23, 2022, pp. 1-4.
International Search Report and Written Opinion for International Patent Application No. PCT/US2022/012907 mailed Mar. 16, 2022, pp. 1-13.
Office Communication for U.S. Appl. No. 16/915,963 mailed Apr. 26, 2022, pp. 1-9.
Office Communication for U.S. Appl. No. 16/672,130 mailed May 19, 2022, pp. 1-33.
Negash, Solomon, "Business Intelligence," Communications of the Association for Information Systems, 2004, vol. 13, pp. 177-195.
Eckerson, Wayne W., "Performance Dashboards Measuring, Monitoring, and Managing Your Business," Business Book Summaries, 2012, pp. 1-11.
Lizotte-Latendresse, Simon et al., "Implementing self-service business analytics supporting lean manufacturing: A state-of-the-art review," 16th IFAC Symposium-Incom, 2018, pp. 1143-1148.
Gröger, Christoph et al., "The Operational Process Dashboard for Manufacturing," SciVerse ScienceDirect, Procedia CIRP, Jul. 2013, pp. 205-210.
Yigitbasioglu, Ogan M. et al., "A review of dashboards in performance management: Implications for design and research," International Journal of Accounting Information Systems, 2012, vol. 13, pp. 41-59.
Adam, Frédéric et al., "Developing Practical Decision Support Tools Using Dashboards of Information," In: Handbook on Decision Support Systems 2. International Handbooks Information System, Springer, Berlin, Heidelberg, 2008, pp. 151-173.
Passlick, Jens et al., "A Self-Service Supporting Business Intelligence and Big Data Analytics Architecture," Proceedings of the 13th International Conference on Wirtschaftsinformatik, 2017, pp. 1126-1140.
Shneiderman, Ben, "The Eyes Have It: A Task by Data Type Taxonomy for Information Visualizations," Proc. Visual Languages, 1996, pp. 1-9.
Alpar, Paul et al., "Self-Service Business Intelligence," Business & Information Systems Engineering, 2016, vol. 58, pp. 151-155.
Kaur, Pawandeep et al., "A Review on Visualization Recommendation Strategies," In Proceedings of the 12th International Joint Conference on Computer Vision, Imaging and Computer Graphics Theory and Applications, 2017, vol. 3, pp. 266-273.
Hoang, Duong Thi Anh et al., "Dashboard by-Example: A Hypergraph-based Approach to On-demand Data warehousing systems," IEEE International Conference on Systems, Man, and Cybernetics, 2012, pp. 1853-1858.
Zhang, Shuo et al., "Ad Hoc Table Retrieval using Semantic Similarity," IW3C2, Creative Commons CC BY 4.0 License, 2018, pp. 1553-1562.
Key, Alicia et al., "VizDeck: Self-Organizing Dashboards for Visual Analytics," SIGMOD International Conference on Management of Data, 2012, pp. 681-684.
Mackinlay, Jock, "Automating the Design of Graphical Presentations of Relational Information," ACM Transactions on Graphics, 1986, vol. 5, No. 2, pp. 110-141.

Touma, Rizkallah et al., "Supporting Data Integration Tasks with Semi-Automatic Ontology Construction," DOLAP '15: Proceedings of the ACM Eighteenth International Workshop on Data Warehousing and OLAP, 2015, pp. 89-98.
Mazumdar, Suvodeep et al., "A Knowledge Dashboard for Manufacturing Industries," ESWC 2011 Workshops, LNCS 7117, 2012, pp. 112-124.
Matera, Maristella et al., "PEUDOM: A Mashup Platform for the End User Development of Common Information Spaces," ICWE 2013, LNCS 7977, 2013, pp. 494-497.
Theorin, Alfred et al., "An Event-Driven Manufacturing Information System Architecture," IFAC/IEEE Symposium on Information Control Problems in Manufacturing, 2015, pp. 1-9.
Lennerholt, Christian et al., "Implementation Challenges of Self Service Business Intelligence: A Literature Review," Proceedings of the 51st Hawaii International Conference on System Sciences, 2018, pp. 5055-5063.
Elias, Micheline et al., "Exploration Views: Understanding Dashboard Creation and Customization for Visualization Novices," INTERACT 2011, Part IV, LNCS 6949, 2011, pp. 274-291.
Buccella, Agustina et al., "Ontology-Based Data Integration Methods: A Framework for Comparison," Revista Colombiana de Computación, 2005, vol. 6, No. 1, pp. 1-24.
Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.
Palpanas, Themis et al., "Integrated model-driven dashboard development," Information Systems Frontiers, 2007, vol. 9, pp. 1-14.
Resnick, Marc L., "Building The Executive Dashboard," Proceedings of the Human Factors and Ergonomics Society 47th Annual Meeting, 2003, pp. 1639-1643.
Sarikaya, Alper et al., "What Do We Talk About When We Talk About Dashboards?," IEEE Transactions on Visualization and Computer Graphics, 2018, pp. 1-11.
Boury-Brisset, Anne-Claire, "Ontology-based Approach for Information Fusion," Proceedings of the Sixth International Conference on Information Fusion, 2003, vol. 1, pp. 522-529.
Park, Laurence A. F. et al., "A Blended Metric for Multi-label Optimisation and Evaluation," ECML/PKDD, 2018, pp. 1-16.
Kintz, Maximilien, "A Semantic Dashboard Description Language for a Process-oriented Dashboard Design Methodology," 2nd International Workshop on Mode-based Interactive Ubiquitous Systems, 2012, pp. 1-6.
Bergamaschi, Sonia et al., "A Semantic Approach to ETL Technologies," Data & Knowledge Engineering, 2011, pp. 1-24.
Office Communication for U.S. Appl. No. 16/368,390 mailed Mar. 2, 2020, pp. 1-8.
International Search Report and Written Opinion for International Patent Application No. PCT/US2020/038157 mailed Oct. 6, 2020, pp. 1-8.
International Search Report and Written Opinion for International Patent Application No. PCT/US2020/057780 mailed Feb. 2, 2021, pp. 1-8.
Barowy, Daniel W. et al., "ExceLint: Automatically Finding Spreadsheet Formula Errors," In Proceedings of the ACM Programming Languages 2, OOPSLA, 2018, Article 148, pp. 1-26.
Barowy, Daniel W et al., "CheckCell: Data Debugging for Spreadsheets," ACM SIGPLAN Notices, 2014, vol. 49, Iss. 10, pp. 507-523.
Donaldson, Alastair F. et al., "Automated Testing of Graphics Shader Compilers," In Proceedings of the ACM Programming Languages 1, OOPSLA, 2017, Article 93, pp. 1-29.
Dragicevic, Pierre et al., "Increasing the Transparency of Research Papers with Explorable Multiverse Analyses," In Proceedings of The ACM CHI Conference on Human Factors in Computing Systems, 2019, Glasgow, United Kingdom, pp. 1-16.
Gotz, David et al., "Visualization Model Validation via Inline Replication," Information Visualization, 2019, pp. 405-425.
Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.

(56) References Cited

OTHER PUBLICATIONS

Guo, Yue et al., "What You See is Not What You Get!: Detecting Simpson's Paradoxes During Data Exploration," In ACM SIGMOD Workshop on Human-in-the-Loop Data Analytics (HILDA), 2017, Article 2, pp. 1-5.
Hynes, Nick et al., "The Data Linter: Lightweight, Automated Sanity Checking for ML Data Sets," In NIPS: Workshop on Systems for ML and Open Source Software, 2017, pp. 1-7.
Kindlmann, Gordon et al., "An Algebraic Process for Visualization Design," IEEE Transactions on Visualization and Computer Graphics, 2014, vol. 20, No. 12, pp. 2181-2190.
Kirby, Robert M. et al., "The Need for Verifiable Visualization," IEEE Computer Graphics and Applications, 2008, vol. 28, No. 5, pp. 78-83.
McNutt, Andrew et al., "Linting for Visualization: Towards a Practical Automated Visualization Guidance System," In VisGuides: 2nd Workshop on the Creation, Curation, Critique and Conditioning of Principles and Guidelines in Visualization, 2018, pp. 1-14.
Muşlu, Kivanç et al., "Preventing Data Errors with Continuous Testing," In Proceedings of the 2015 International Symposium on Software Testing and Analysis, ACM, 2015, pp. 373-384.
Salimi, Babak et al., "Bias in OLAP Queries: Detection, Explanation, and Removal." In Proceedings of the 2018 International Conference on Management of Data, ACM, 2018, pp. 1021-1035.
Tang, Nan et al., "Towards Democratizing Relational Data Visualization," In Proceedings of the 2019 International Conference on Management of Data, ACM, 2019, pp. 2025-2030.
Wall, Emily et al., "Warning, Bias May Occur: A Proposed Approach to Detecting Cognitive Bias in Interactive Visual Analytics," In 2017 IEEE Conference on Visual Analytics Science and Technology (VAST), IEEE, 2017, pp. 104-115.
Wickham, Hadley et al., "Graphical Inference for Infovis," IEEE Transactions on Visualization and Computer Graphics 16, 2010, pp. 973-979.
Anand, Anushka et al., "Automatic Selection of Partitioning Variables for Small Mulitple Displays," IEEE Transactions on Visualization and Computer Graphics, 2015, vol. 22, Iss. 1, pp. 669-677.
Anonymous, "Glitchart: When charts attack," https://glitch-chart.tumblr.com/, 2019, Accessed Feb. 5, 2020, p. 1.
Armstrong, Zan et al., "Visualizing Statistical Mix Effects and Simpson's Paradox," IEEE Transactions on Visualization and Computer Graphics, 2014, vol. 20, No. 12, pp. 2132-2141.
Barr, Earl T. et al., "The Oracle Problem in Software Testing: A Survey," IEEE Transactions on Software Engineering, 2015, vol. 41, No. 5, pp. 507-525.
Binnig, Carsten et al., "Toward Sustainable Insights, or Why Polygamy is Bad for You," In Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identität und Vielfalt der Kommunikations-wissenschaft, 2009, pp. 1-22.
Bresciani, Sabrina et al., "The Pitfalls of Visual Representations: A Review and Classification of Common Errors Made While Designing and Interpreting Visualizations," SAGE Open, 2015, pp. 1-14.
Cairo, Alberto, "Graphic Lies, Misleading Visuals," In New Challenges for Data Design, Springer, 2015, pp. 103-116.
Chi, Ed Huai-Hsin, "A Taxonomy of Visualization Techniques Using the Data State Reference Model," In IEEE Symposium on Information Visualizations, 2000, pp. 69-75.
Chiw, Charisee et al., "DATm: Diderot's Automated Testing Model," In IEEE/ACM 12th International Workshop on Automation of Software Testing (AST), IEEE, 2017, pp. 45-51.
Cleveland, William S. et al., "Variables on Scatterplots Look More Highly Correlated When the Scales are Increased," Science, 1982, vol. 216, No. 4550, pp. 1138-1141.
Cockburn, Andy et al., "Hark No More: On the Preregistration of CHI Experiments," In Proceedings of the 2018 CHI Conference on Human Factors in Computing Systems, ACM, 2018, pp. 1-12.

Correll, Michael, "Ethical Dimensions of Visualization Research," In Proceedings of the 2019 CHI Conference on Human Factors In Computing Systems, ACM, 2019, pp. 1-13.
Correll, Michael et al., "Truncating the Y-Axis: Threat or Menace?," arXiv preprint arXiv:1907.02035, 2019. pp. 1-12.
Correll, Michael et al., "Surprise! Bayesian Weighting for De-Biasing Thematic Maps," IEEE Tranactions on Visualization and Computer Graphics, 2016, pp. 1-10.
Correll, Michael et al., "Black Hat Visualization," In IEEE VIS; Workshop on Dealing With Cognitive Biases in Visualizations, 2017, pp. 1-4.
Correll, Michael et al., "Looks Good To Me: Visualizations As Sanity Checks," IEEE Transactions on Visualizations and Computer Graphics, 2018, pp. 1-10.
Diehl, Alexandra et al., "VisGuides: A Forum for Discussing Visualization Guidelines," In Proceedings of the Eurographics/IEEE VGTC Conference on Visualization: Short Papers, Eurographics Association, 2018, pp. 61-65.
D'Ignazio, Catherine et al., "Feminist Data Visualization," In IEEE VIS: Workshop on Visualization for the Digital Humanities (VIS4DH), 2016, pp. 1-5.
Dimara, Evanthia et al., "A Task-Based Taxonomy of Cognitive Biases for Information Visualization," IEEE Transactions on Visualization and Computer Graphics, 2018, pp. 1-21.
Dörk, Marian et al., "Critical InfoVis: Exploring the Politics of Visualization," In 2013 ACM SIGCHI Conference on Human Factors in Computing Systems, Extended Abstracts, 2013, pp. 2189-2198.
Efron, Bradley, "Bootstrap Methods: Another Look at the Jackknife," The Annals of Statistics, 1979, vol. 7, No. 1, pp. 1-26.
Filipov, Velitchko et al., "CV3: Visual Exploration, Assessment, and Comparison of CVs," In Computer Graphics Forum, Wiley Online Library, 2019, pp. 107-118.
Ford, Brian, "Write-Good: Naive Linter for English Prose," https://github.com/btford/write-good Accessed: Feb. 6, 2020, pp. 1-6.
Gelman, Andrew et al., "The garden of forking paths: Why multiple comparisons can be a problem, even when there is no "fishing expedition" or "p-hacking" and the research hypothesis was posited ahead of time," Department of Statistics, Columbia University, 2013, pp. 1-17.
World Bank Group, "World Development Indicators," http://datatopics.worldbank.org/world-development-indicators/, 2020, pp. 1-6.
Haraway, Donna, "Situated Knowledges: The Science Question in Feminism and the Privilege of Partial Perspective," Feminist Studies, 1988, vol. 14, No. 3, pp. 575-599.
Heer, Jeffrey, "Agency plus automation: Designing artificial intelligence into interactive systems," in Proceedings of the National Academy of Sciences, 2019, vol. 116, No. 6, pp. 1844-1850.
Heer, Jeffrey, "Visualization is Not Enough," https://homes.cs.washington.edu/~jheer/talks/EuroVis2019-Capstone.pdf EuroVis Capstone, 2019, pp. 1-113.
Heer, Jeffrey et al., "Multi-Scale Banking to 45 Degrees," IEEE Transactions on Visualization and Computer Graphics, 2006, vol. 12, No. 5, pp. 701-708.
Hibbard, William L. et al., "A Lattice Model for Data Display," In Proceedings of the Conference on Visualization, IEEE Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How To Lie With Statistics," WW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.
Isenberg, Tobias et al., "A Systematic Review on the Practice of Evaluating Visualization," IEEE Transactions on Visualization and Computer Graphics, 2013, vol. 19, No. 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.

(56) References Cited

OTHER PUBLICATIONS

Kandel, Sean et al., "Research directions in data wrangling: Visualizations and transformations for usable and credible data," Information Visualization, 2011, vol. 10, No. 4, pp. 271-288.

Kandel, Sean et al., "Profiler: Integrated Statistical Analysis and Visualization for Data Quality Assessment," In Proceedings of the International Working Conference on Advanced Visual Interfaces, ACM, 2012, pp. 547-554.

Kim, Won et al., "A Taxonomy of Dirty Data," Data Mining and Knowledge Discovery, 2003, vol. 7, No. 1, pp. 81-89.

Kindlmann, Gordon et al., "Algebraic Visualization Design for Pedagogy," IEEE VIS: Workshop on Pedagogy of Data Visualization, 2016, pp. 1-5.

Kong, Ha-Kyung et al., "Frames and Slants in Titles of Visualizations on Controversial Topics," In Proceedings of the 2018 CHI Conference on Human Factors in Computing Systems, ACM, 2018, pp. 1-12.

Kong, Ha-Kyung et al., "Trust and Recall of Information across Varying Degrees of Title—Visualization Misalignment," In Proceedings of the 2019 CHI Conference on Human Factors In Computing Systems, ACM, 2019, 346, pp. 1-13.

Amperser Labs, "Proselint: A linter for prose," http://proselint.com/, Accessed: Feb. 10, 2020, pp. 1-3.

Lavigne, Sam et al., "Predicting Financial Crime: Augmenting the Predictive Policing Arsenal," arXiv preprint arXiv:1704.07826, 2017, pp. 1-8.

Ziemkiewicz, Caroline et al., "Embedding Information Visualization Within Visual Representation," In Advances in Information and Intelligent Systems, Springer, 2009, pp. 1-20.

Zhou, Zhi Quan et al., "Metamorphic Testing of Driverless Cars," Communications of the ACM, 2019, vol. 62, No. 3, pp. 61-67.

Zhao, Zheguang et al., "Controlling False Discoveries During Interactive Data Exploration," In proceedings of the 2017 International Conference on Management of Data, ACM, 2016, pp. 527-540.

Lundgard, Alan et al., "Sociotechnical Considerations for Accessible Visualization Design," IEEE Transactions on Visualization and Computer Graphics, 2019, pp. 1-5.

Lunzer, Aran et al., "It Ain't Necessarily So: Checking Charts for Robustness," IEEE VisWeek Poster Proceedings, 2014, pp. 1-3.

Lupi, Giorgia, "Data Humanism: The Revolutionary Future of Data Visualization," Print Magazine 30, 2017, pp. 1-10.

Mackinlay, Jock et al., "Show Me: Automatic Presentation for Visual Analysis," IEEE Transactions on Visualization and Computer Graphics, 2007, vol. 13, No. 6, pp. 1137-1144.

Matejka, Justin et al., "Same Stats, Different Graphs: Generating Datasets with Varied Appearance and Identical Statistics Through Simulated Annealing," In Proceedings of the 2017 CHI Conference on Human Factors in Computing Systems, ACM, 2017, pp. 1290-1294.

Mayorga, Adrian et al., "Splatterplots: Overcoming Overdraw in Scatter Plots," IEEE Transactions on Visualization and Computer Graphics, 2013, vol. 19, No. 9, pp. 1526-1538.

Mayr, Eva et al., "Trust in Information Visualization," In EuroVis Workshop on Trustworthy Visualization (TrustVis), Robert Kosara, Kai Lawonn, Lars Linsenm, and Noeska Smit (Eds.), The Eurographics Association, 2019, pp. 1-5.

Micallef, Luana et al., "Towards Perceptual Optimization of the Visual Design of Scatterplots," IEEE Transactions on Visualization and Computer Graphics, 2017, vol. 23, No. 6, pp. 1-12.

Moere, Andrew Vande, "Towards Designing Persuasive Ambient Visualization," In Issues in the Design & Evaluation of Ambient Information Systems Workshop, Citeseer, 2007, pp. 48-52.

Moritz, Dominik et al., "Formalizing Visualization Design Knowledge as Constraints: Actionable and Extensible Models in Draco," IEEE Transactions on Visualization and Computer Graphics, 2018, vol. 25, No. 1, pp. 438-448.

Newman, George E. et al., "Bar graphs depicting averages are perceptually misinterpreted: The within-the-bar bias," Psychonomic Bulletin & Review, 2012, vol. 19, No. 4, pp. 601-607.

Onuoha, Mimi, "On Missing Data Sets," https://github.com/mimionuoha/missing-datasets, Accessed: Feb. 10, 2020, pp. 1-3.

Pandey, Anshul Vikram et al., "How Deceptive are Deceptive Visualizations?: An Empirical Analysis of Common Distortion Techniques," In Proceedings of the 33rd Annual ACM Conference on Human Factors in Computing Systems, ACM, 2015, pp. 1469-1478.

Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.

Plaisant, Catherine, "Information Visualization and the Challenge of Universal Usability," In Exploring Geovisualization, Elsevier, 2005, pp. 1-19.

Pu, Xiaoying et al., "The Garden of Forking Paths in Visualization: A Design Space for Reliable Exploratory Visual Analyics: Position Paper," In IEEE VIS: Evaluation and Beyond—Methodological Approaches for Visualization (BELIV), IEEE, 2018, pp. 37-45.

Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.

Raman, Vijayshankar et al., "Potter's Wheel: An Interactive Data Cleaning System," In Proceedings of the 27th International Conference on Very Large Data Bases, 2001, vol. 1, pp. 381-390.

Redmond, Stephen, "Visual Cues in Estimation of Part-To-Whole Comparisons," IEEE Transactions on Visualization and Computer Graphics, 2019, pp. 1-6.

Ritchie, Jacob et al., "A Lie Reveals the Truth: Quasimodes for Task-Aligned Data Presentation," In Proceedings of the 2019 CHI Conference on human Factors in Computing Systems, ACM, 193, 2019, pp. 1-13.

Rogowitz, Bernice E. et al., "The "Which Blair Project": A Quick Visual Method for Evaluating Perceptual Color Maps," In IEEE Visualization 2001, Proceedings, 2001, pp. 183-190.

Rogowitz, Bernice E. et al., "How Not to Lie with Visualization," Computers in Physics, 1996, vol. 10, No. 3, pp. 268-273.

Rosling, Hans et al., "Health advocacy with Gapminder animated statistics," Journal of Epidemiology and Global Health, 2011, vol. 1, No. 1, pp. 11-14.

Sacha, Dominik et al., "The Role of Uncertainty, Awareness, and Trust in Visual Analytics," IEEE Transactions on Visualization and Computer Graphics, 2016, vol. 22, No. 1, pp. 240-249.

Satyanarayan, Arvind et al., "Vega-Lite: A Grammar of Interactive Graphics," IEEE Transactions on Visualization and Computer Graphics, 2016, vol. 23, No. 1, pp. 341-350.

Segura, Sergio et al., "A Survey on Metamorphic Testing," IEEE Transactions on Software Engineering, 2016, vol. 42, No. 9, pp. 805-824.

Song, Hayeong et al., "Where's My Data? Evaluating Visualizations with Missing Data," IEEE Transactions on Visualization and Computer Graphics, 2018, vol. 25, No. 1, pp. 914-924.

Srinivasan, Arjun et al., "Augmenting Visualizations with Interactive Data Facts to Facilitate Interpretation and Communication," IEEE Transactions on Visualization and Computer Graphics, 2018, vol. 25, No. 1, pp. 672-681.

Stonebraker, Michael et al., "Data Curation at Scale: The Data Tamer System," In Proceedings of the 6th Biennial Conference on Innovative Data Systems Research, 2013, pp. 1-10.

Szafir, Danielle Albers, "The Good, the Bad, and the Biased: Five Ways Visualizations Can Mislead (and How to Fix Them)," ACM Interactions, 2018, vol. 25, No. 4, pp. 26-33.

Tableau, "Tableau Prep," https://www.tableau.com.products/prep/, 2020, pp. 1-13.

Trifacta, "Trifacta," https://www.trifacta.com/, 2020, pp. 1-8.

Trulia, "New York Real Estate Market Overview," https://www.trulia.com/real_estate/New_York-New_York/, 2020, Accessed: Feb. 11, 2020, pp. 1-3.

Valdez, André Calero et al., "A Framework for Studying Biases in Visualization Research," 2017, pp. 1-5.

Van Wijk, Jarke J., "The Value of Visualization," In VIS 05, IEEE Visualization, 2005, IEEE, pp. 79-86.

(56) References Cited

OTHER PUBLICATIONS

Vanderplas, Jacob et al., "Altair: Interactive Statistical Visualizations for Python," The Journal of Open Source Software, 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.
Vickers, Paul et al., "Understanding Visualization: A Formal Foundation using Category Theory and Semiotics," IEEE Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," In Proceedings of the 2019 International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer Graphics, 2018, vol. 25, No. 1, pp. 759-768.
Wu, Eugene et al., "Scorpion: Explaining Away Outliers in Aggregate Queries," Proceedings of the VLDB Endowment, 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Tranactions on Visualization and Computer Graphics, 2019, pp. 1-12.
Zgraggen, Emanuel et al., "Investigating the Effect of the Multiple Comparisons Problem in Visual Analysis," In Proceedings of the 2018 CHI Conference on Human Factors in Computing Systems, ACM, 2018, pp. 1-12.
International Search Report and Written Opinion for International Patent Application No. PCT/US2020/050722 mailed Nov. 24, 2020, pp. 1-6.
Arai, Taichi et al., "Preventing the creation of misleading graphs, Targeted learning tool," IPSJ SIG Technical Report, vol. 2018-GN-104, No. 4, ISSN 2188-8744, Mar. 2018, pp. 1-17.
Office Communication for U.S. Appl. No. 17/014,882 mailed Apr. 27, 2021, pp. 1-27.
Office Communication for U.S. Appl. No. 16/732,027 mailed Jun. 14, 2021, pp. 1-22.
Office Communication for U.S. Appl. No. 16/915,963 malled Jul. 19, 2021, pp. 1-9.
Office Communication for U.S. Appl. No. 16/903,967 mailed Sep. 27, 2021, pp. 1-16.
Office Communication for U.S. Appl. No. 17/014,882 mailed Nov. 2, 2021, pp. 1-33.
International Search Report and Written Opinion for International Patent Application No. PCT/US2021/043167 mailed Oct. 26, 2021, pp. 1-7.
International Search Report and Written Opinion for International Patent Application No. PCT/US2021/043177 mailed Oct. 26, 2021, pp. 1-8.
Office Communication for U.S. Appl. No. 16/732,027 mailed Nov. 15, 2021, pp. 1-25.
International Search Report and Written Opinion for International Patent Application No. PCT/US2021/049229 mailed Nov. 16, 2021, pp. 1-8.
Office Communication for U.S. Appl. No. 16/944,064 mailed Nov. 26, 2021, pp. 1-50.
Office Communication for U.S. Appl. No. 16/672,130 mailed Jan. 5, 2022, pp. 1-32.
Office Communication for U.S. Appl. No. 16/915,963 mailed Jan. 7, 2022, pp. 1-9.
Office Communication for U.S. Appl. No. 17/014,882 malled Jan. 25, 2022, pp. 1-6.
Wu, Aoyu et al., "MultiVision: Designing Analytical Dashboards with Deep Learning Based Recommendation," IEEE, arXiv preprint, arXiv:2107.07823, Jul. 2021, pp. 1-11.
Shi, Danqing et al., "Talk2Data: High-Level Question Decomposition for Data-Oriented Question and Answering," arXiv preprint, arXiv:2107.14420, Jul. 2021, pp. 1-11.
Wang, Yun et al., "DataShot: Automatic Generation of Fact Sheets from Tabular Data," IEEE Transactions on Visualization and Computer Graphics, vol. 26, No. 1, Aug. 2019, pp. 1-11.
Wang Baldonado, Michelle Q. et al., "Guidelines for Using Multiple Views in Information Visualization," AVI '00, In Proceedings of the Working Conference on Advanced Visual Interfaces, May 2000, pp. 1-10.
Chen, Xi et al., "Composition and Configuration Patterns in Multiple-View Visualizations," arXiv preprint, arXiv:2007.15407, Aug. 2020, pp. 1-11.
Crisan, Anamaria et al., "GEViTRec: Data Reconnaissance Through Recommendation Using a Domain-Specific Visualization Prevalence Design Space," IEEE Transactions on Visualization and Computer Graphics, TVCG Submission, Jul. 2021, pp. 1-18.
Office Communication for U.S. Appl. No. 16/732,027 mailed Oct. 28, 2022, pp. 1-11.
Office Communication for U.S. Appl. No. 17/158,911 mailed Dec. 23, 2022, pp. 1-37.
Office Communication for U.S. Appl. No. 16/944,085 mailed Aug. 30, 2022, pp. 1-9.
Office Communication for U.S. Appl. No. 16/944,085 mailed Sep. 9, 2022, pp. 1-2.
Office Communication for U.S. Appl. No. 16/672,130 mailed Sep. 13, 2022, pp. 1-35.
Office Communication for U.S. Appl. No. 17/014,882 mailed Sep. 28, 2022, pp. 1-11.
Office Communication for U.S. Appl. No. 16/915,963 mailed Oct. 5, 2022, pp. 1-7.
Office Communication for U.S. Appl. No. 17/014,882 mailed Jun. 9, 2022, pp. 1-8.
Office Communication for U.S. Appl. No. 16/732,027 mailed Jun. 14, 2022, pp. 1-18.
Office Communication for U.S. Appl. No. 17/158,911 mailed Jun. 28, 2022, pp. 1-29.
Office Communication for U.S. Appl. No. 16/672,130 mailed Aug. 2, 2022, pp. 1-5.
Office Communication for U.S. Appl. No. 17/158,911 mailed Apr. 27, 2023, pp. 1-40.
Office Communication for U.S. Appl. No. 16/672,130 mailed May 19, 2023, pp. 1-5.
Office Communication for U.S. Appl. No. 17/344,633 mailed Jun. 27, 2023, pp. 1-43.
Office Communication for U.S. Appl. No. 16/672,130 mailed Jul. 3, 2023, pp. 1-39.

\* cited by examiner

```
{   "description": "Analysis of a single measure across dimensions",
    "intent": "measure_analysis",
    "attrReq": "1q, 4c, 1g, 1t",
    "visualizations": {
    {
            "id": 1,
            "chart": "data_summary",
            "dataReq": ["q"],
            "spec": {...}
    },
    {
        "id": 2,
        "chart": "bar_chart",
        "dataReq": ["q", "c"],
        "spec": {...}
    },
    ...
    {
        "id": 6,
        "chart": "line_chart",
        "dataReq": ["q", "t"],
        "spec": {...}
    }

},
    "controls": {
    {
        "id": 1,
        "type": "select",
        "attr": ["c"]
    },
    {
        "id": 2,
        "type": "select",
        "attr": ["g"]
    },
    {
        "id": 3,
        "type": "range",
        "attr": ["t"]
    },
    ...
    }
}
```

Fig. 5

INTENT DRIVEN DASHBOARD RECOMMENDATIONS

TECHNICAL FIELD

The present invention relates generally data visualizations, and more particularly, but not exclusively to, intent driven dashboard recommendations.

BACKGROUND

Organizations are generating and collecting an ever-increasing amount of data. This data may be associated with disparate parts of the organization, such as, consumer activity, manufacturing activity, customer service, network activity logs, and big data. In some cases, the quantity and dissimilarity of data associated with an organization may make it difficult to effectively utilize available data to improve business practices, provide useful business intelligence, or otherwise reason about their data. Accordingly, in some cases, organizations may employ computer-based applications or tools to generate user interfaces, such as, dashboards that may provide one or more visualizations, or the like, to help enable improved reasoning about some or all of their data or business operations.

However, in some cases, there may be limited support for users to discover and browse groups of visualizations that may be used to create dashboards that help convey a coherent message about the underlying data. Due to the lack of analytically-driven guidance for dashboard authoring, users may be compelled to create a series of individual visualizations, identifying which visualizations that may comply with their eventual dashboard design goals, and then composing the dashboard with the relevant subset of visualizations. As a result, the workflow of creating dashboards may be more an afterthought rather than being an active part of a user's analytical thought process. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 5 illustrates a portion of data structure that represents a portion of a collection specification for intent driven dashboard recommendations in accordance with one or more of the various embodiments;

DETAILED DESCRIPTION OF VARIOUS EMBODIMENTS

Figure 1:
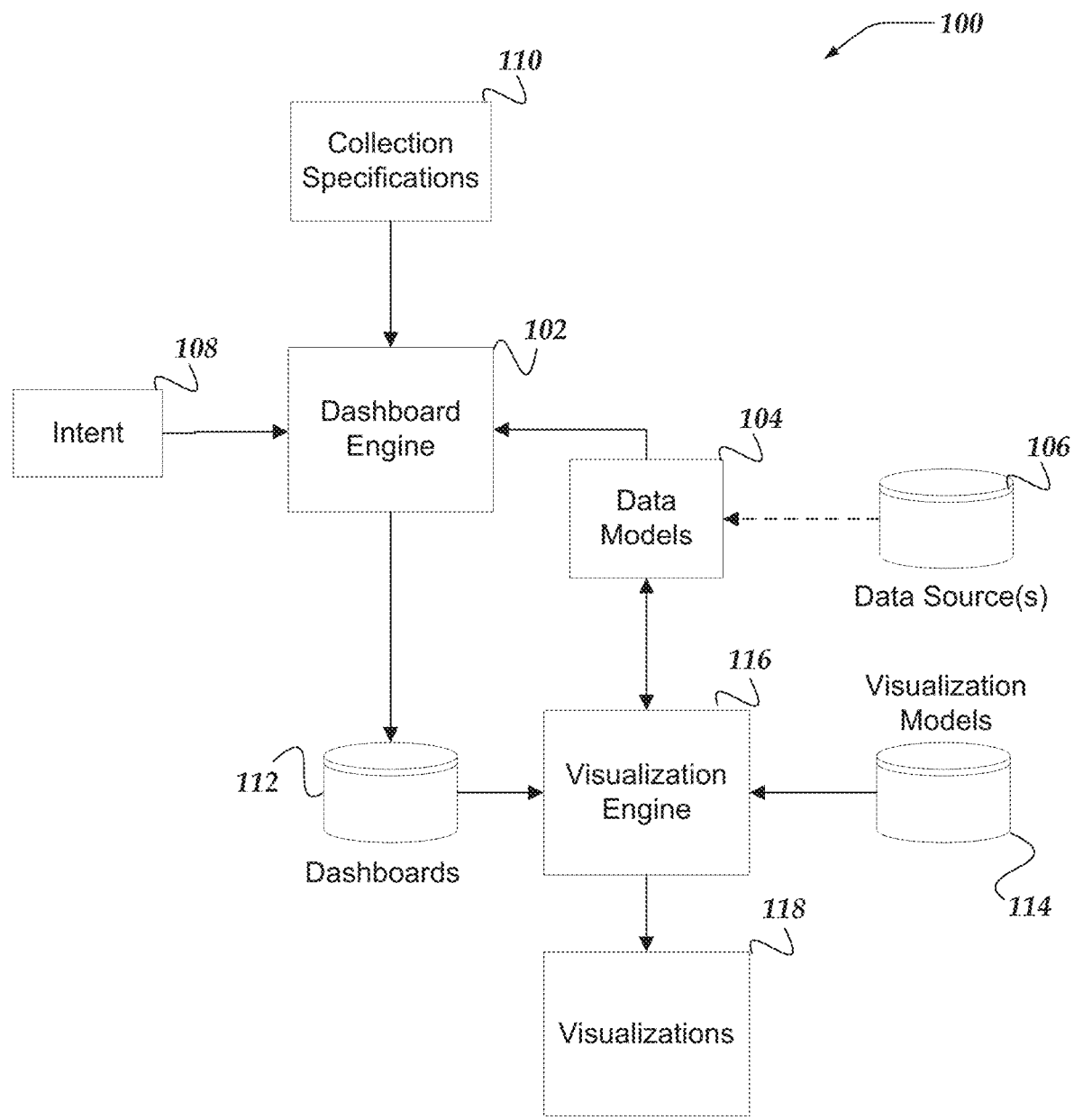
FIG. 1 illustrates a logical architecture of a system for intent driven dashboard recommendations in accordance with one or more of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, NoSQL, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy-to-understand presentation or visualization of the data.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "attribute" refers to a named or nameable property or attribute of a data object. In some cases, data fields may be considered analogous to class members of an object in object-oriented programming.

As used herein the term "visualization model" refers to one or more data structures that visualization engines may employ to generate visualizations for display on one or more hardware displays. Visualization models may define various features or objects that visualization engines may render into a displayed visualization including styling or user interface features that may be made available to non-authoring users.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "dashboard" refers to user interfaces that may be specialized for representing dashboard user interfaces. Conventionally, dashboard user interfaces present a collection of related visualizations that enable users to quickly "see" information that may be important to an organization or its operation. The particular visualizations that comprise a given dashboard user interface may varying factors, including subject matter, problem domain, purpose of the dashboard, author intent, Typically, though not always, dashboards may comprise two or more visualizations or user interface controls arranged using tiled layouts, floating layouts, or the like. In some cases, dashboards may be interactive or one or more visualizations in a dashboard may be interactive. Also, in some cases, dashboards may include other user interface features, such as, legends, one or more user interface controls, text annotations, or the like.

As used herein the term "composition dashboard" refers to dashboard that may be in the process of being authored.

As used herein the term "control" refers to a user interface control that may be included in a dashboard. Controls may include sliders, selection lists, dropdown lists, radio button groups, checkboxes, or the like. Controls in a dashboard may enable users to interact with one or more relevant visualizations in the dashboard.

As used herein the term "collection" refers to a coherent set of visualizations and controls that collectively map to an author intent. Visualizations or controls included in a collection may be logically grouped in terms of data attributes, chart types, interactions between visualizations, or the like. In some cases, collections may be considered to be exemplary dashboards recommended and presented to dashboard authors.

As used herein the terms "author intent," or "intent" refer to high-level analytical goals that dashboard authors may intends to accomplish through a dashboard. For example, intents may include: measure analysis for supporting the analysis of one or more measure fields (e.g., "Comparing Sales and Profit"); change analysis for presenting the change in measure values over time (e.g., "Displaying Year-over-Year Sales"); category analysis for analyzing a dataset with respect to two or more categories (e.g., "Comparing Female vs Male athletes in the Olympic games"); distribution Analysis for summarizing the number/count of items with respect to different categorical and quantitative attributes in the dataset (e.g., "Showing the number of employees in different departments, salary brackets, or the like"); or the like.

As used herein the term "collection specification" refers one or more data structures that declare the required/preferred attribute types, visualizations, or controls, or the like, that may be included in collections. Collection specifications may be associated with an author intent.

As used herein the term "visualization declaration" refers to one or more portions of a collection specification that may be directed to defining one or more requirements or one or more characteristics of visualizations that may be included in collections generated based on a collection specification.

As used herein the term "control declaration" refers to one or more portions of a collection specification that may be directed to defining one or more requirements or one or more characteristics of controls that may be included in collections generated based on a collection specification.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to intent driven dashboard recommendations. In one or more of the various embodiments, a plurality of collection specifications that declare one or more visualization declarations may be provided such that each collection specification is associated with an author intent.

In one or more of the various embodiments, one or more attributes-of-interest that may be selected from a data source may be provided.

In one or more of the various embodiments, a plurality of collections may be generated based on the plurality of collection specifications, the attributes-of-interest, data from the data source, or the like, such that each collection may include one or more visualizations that may be based on the one or more visualization declarations.

In one or more of the various embodiments, a plurality of preference scores may be generated for each collection based on the author intent, one or more visualizations in each collection, or the one or more attributes-of-interest such that each collection may be associated with a preference score.

In one or more of the various embodiments, one or more of the plurality of collections may be classified based on one or more preference scores associated with the one or more classified collections such that the one or more classified collections may be displayed based on the one or more preference scores.

In one or more of the various embodiments, in response to including one or more visualizations from the one or more classified collections in a composition dashboard further actions may be performed, including: updating the one or more preference scores associated with the one or more visualizations from the one or more classified collections; re-classifying the one or more classified collections based on the one or more updated preference scores such that the one or more reclassified collections are displayed based on the one or more updated preference scores; or the like.

In one or more of the various embodiments, in response to positioning or sizing the one or more visualizations in the composition dashboard further actions may be performed, including: updating the one or more preference scores associated with the one or more visualizations based on the positioning or the sizing of the one or more visualizations; re-classifying the one or more classified collections based on the one or more updated preference scores such that the one or more reclassified collections may be displayed based on the one or more updated preference scores; or the like.

In one or more of the various embodiments, in response to selecting a visualization in the composition dashboard further actions may be performed, including: determining a portion of the one or more visualizations that share one or more attributes from the data source; displaying an indication that the portion of the one or more visualizations may be eligible for linking to the selected visualization; or the like.

In one or more of the various embodiments, one or more required attribute types may be determined for the one or more visualization declarations in each collection specification; in response to two or more attributes in the data source matching a same required attribute type for a visualization declaration in a collection specification, performing further actions, including: generating two or more candidate visualizations for the visualization declaration such that each candidate visualization corresponds to one of the two or more attributes; generating an interest score for each candidate visualization based on one or more characteristics of each candidate visualization; including a candidate visualization associated with a highest interest score in a collection that corresponds to the collection specification; or the like.

In one or more of the various embodiments, declaring the one or more visualization declarations may include: declaring one or more required attribute types for a visualization; declaring one or more visualization types for the visualization; associating a visualization model with the visualization; or the like.

In one or more of the various embodiments, generating the plurality of collections based on the plurality of collection specifications further includes generating one or more controls based on one or more control declarations included in one or more portions of the plurality of collection specifications such that the one or more controls enable a user to interactively modify the values of one or more attributes associated with a portion of the plurality of collections that correspond to the one or more portions of the plurality of collection specifications.

In one or more of the various embodiments, author intent may further include one of a measure analysis, a change analysis, a category analysis, a distribution analysis, or the like.

Illustrative Logical System Architecture

FIG. 1 illustrates a logical architecture of system 100 for intent driven dashboard recommendations in accordance with one or more of the various embodiments. In one or more of the various embodiments, system 100 may be a visualization platform arranged to include various components including, dashboard engine 102, data models 104, data source(s) 106, intention collection 108, collection specifications 110, dashboards 112, visualization models 114, visualization engine 116, visualizations 118, or the like.

In one or more of the various embodiments, data sources 106 may represent a source of raw data, records, data items, or the like, that provide the underlying data may be employed for generating visualizations.

In one or more of the various embodiments, data models, such as, data models 104 may be data structures, or the like, that provide one or more logical representations of the information stored in one or more data sources, such as, data source 106. In some embodiments, data models may include data objects that correspond to one or more portions of tables, views, or files in data sources. For example, in some embodiments, if data source 106 is a CSV file or a database, a data model may comprise of one or more data objects that may correspond to record fields in data source 106. Likewise, in some embodiments, data models may include fields or attributes that correspond to fields or attributes in data sources. For example, in some embodiments, if data source 106 is a Relational Database System (RDBMS), a data model included in data models 104 may be comprised of one or more data model fields that correspond to one or more columns or one or more tables included in data sources 106.

In some embodiments, a visualization engine, such as, visualization engine 116 may be employed to transform data from data sources 106 into data models 104. In some embodiments, visualization engines may be arranged to employ or execute computer readable instructions provided by configuration information to determine some or all of the steps for transforming values in data sources into data models. For example, visualization engines may be arranged to provide one or more user interfaces that enable users to author/design data models from data sources.

In one or more of the various embodiments, visualization engines, such as, visualization engine 116 may be arranged to employ visualization models, such as, visualization models 1114 to determine the layout, styling, interactivity, or the like, for visualizations, such as, visualizations 118 that may be displayed to users. Also, in some embodiments, visualization engines may be arranged to employ data provided via data sources 106 to populate visualizations with values based on data models.

In one or more of the various embodiments, visualization models may be defined using one or more visualization specifications. In some embodiments, visualization specifications may include computer readable instructions, such as, formal or semi-formal rules that may correspond to one or more portions of visualization models. In some embodiments, visualization specifications may be used to represent or define one or more visualization models. In some embodiments, visualization specifications may be employed to generate visualization models or visualizations.

In some embodiments, dashboard user interfaces, such as, dashboards 112, may be a common form of visual analytics that may often be employed in business intelligence applications, informatics, or industrial monitoring as well as many other domains or analytical tasks. In some embodiments, these visual displays may take many forms and styles based on the data acquired and the information needs of the viewer or analyst. In some cases, due to this variety, there may be a lack of consistent, agreed-to definitions for what constitutes a quality dashboard visualization. Accordingly, it may be conventional to adopt a broad view of what can be considered a dashboard including infographics, narrative elements, or the like. Herein, for some embodiments, dashboard user interfaces may be user interfaces arranged to at least include a visual display of important information that may be needed to achieve one or more user intentions or objectives; consolidated and arranged on a single screen so the information may be monitored at a glance.

However, in some cases, it may be difficult for users (e.g., dashboard authors) to readily identify the type of visualizations (from data sources or data models) that may be advantageous for including in dashboards. For example, some organizations may have hundreds or thousands of visualizations and, for example, some organizations may have many data sources or many data models. Further, in some cases, some or many visualizations, data models, or data sources may include redundant information. For example, two different authors may make different though similar visualizations representing the same or similar information. Thus, in some cases, all of these factors or more may contribute to making the design of dashboards challenging to non-experienced authors or experienced authors alike.

Accordingly, in some embodiments, dashboard engines, such as, dashboard engine 102 may be arranged to automatically provide guidance or assistance to dashboard authors. In some embodiments, dashboard engines may be arranged to evaluate user intentions to determine one or more collections based on one or more collection specifications, such as, collection specifications 110. In some embodiments, intents 108 may represent a collection of known/declared user intentions that may be used to drive the generation of collections. In some embodiments, one or more collection specifications may be associated with one or more intentions. In some cases, one or more intentions may be associated with one or more sub-intentions that may further refine a more generalization intentions. Accordingly, in some embodiments, one or more collection specifications may be associated with one or more sub-intentions.

Accordingly, in some embodiments, intents in this context may represent high-level analytical goals that authors may expect to accomplish via a dashboard. For example, in some embodiments, intentions may include one or more of measure analysis (supporting the analysis of one or more measure fields such as comparing sales and profit, or the like), change analysis (presenting the change in measure values over time such as displaying year-over-year sales, or the like), category analysis (analyzing a data set with respect to two or more categories such comparing metrics associated with minor athletes to adult athletes in a specific sport), distribution analysis (summarizing the count of items with respect to different categorical and quantitative attributes in the data set such as showing the number of employees in different departments, or the like), or the like.

Further, in some embodiments, intents may be associated with one or more sub-intents. For example, for some embodiments, sub-intents for measure analysis may include single measure summaries, top N and bottom M, measure comparison, multi-measure summaries, or the like. And, for example, for some embodiments, sub-intents for change analysis may include year-over-year change, change summary, or the like. And, for example, for some embodiments, sub-intents for category analysis may include category-over-category, category over measure, or the like.

In one or more of the various embodiments, dashboard engines may be arranged to employ one or more rules (inference rules) to infer the intent of authors based on their selections or activity. In some embodiments, dashboard engines may be arranged to employ one or more conditions or criteria included in or declared by inference rules to infer intents or sub-intents. In some embodiments, dashboard engines may be arranged to modify or refine the determination of author intent as dashboard authors perform more authoring actions.

In one or more of the various embodiments, dashboard engines may be arranged to support a variety of intents that may vary over time or across organizations. For example, in some embodiments, one or more organizations may have specialized or customized intents or sub-intents. Likewise, for example, in some cases, licensing considerations may determine some or all intents that may be available to an organization. Further, in some embodiments, additional intents or sub-intents may be discovered or derived from observing user/author activity. Note, for brevity and clarity, unless the context of usage indicates otherwise, the term intent is intended here to include sub-intents. Thus, generally discussion or descriptions directed to intents may apply to sub-intents. Further, in some cases, an intent may not be associated with sub-intents. Also, in some cases, sub-intents may be considered categories or types of intents.

Accordingly, in some embodiments, dashboard engines may be arranged to determine the intents or criteria/condition for inferring intents based on rules, instructions, libraries, or the like, provided via configuration information to account for local requirements or local circumstances.

In one or more of the various embodiments, collection specifications represented by collection specifications 110 may be considered to declare a coherent set of visualizations that may collectively map to an intent. In this context, coherence may refer to the visualizations being logically grouped and complementary in terms of the attributes used, the visualization types, as well as the interactions between visualizations. Accordingly, in some embodiments, dashboard engines may be arranged to employ collection specifications to generate collections that may be recommended to dashboard authors.

In one or more of the various embodiments, dashboard engines may be arranged to infer author intent based on one or more inference rules. Accordingly, in some embodiments, dashboard engines may be arranged to determine one or more collection specifications that may be associated with the inferred intents. In some embodiments, collection specifications may be declared to be associated with one or more particular intents. For example, in some embodiments, each dashboard specification may be provided for one or more particular intents. For example, an organization may survey existing dashboards to determine one or more common characteristics that may be related specific intents to particular types of dashboards. Thus, for some embodiments, collection specifications may be designed based on the one or more common characteristics and associated with particular intents.

In one or more of the various embodiments, dashboard engines may be arranged to provide user interfaces that enable users to provide inputs, such as, as selecting attributes, selecting intents, or the like. Accordingly, in some embodiments, dashboard engines may be arranged to employ intent inference rules to determine intent for dashboard authors.

In one or more of the various embodiments, dashboard engines may be arranged to user interfaces that enable authors to select one or more data models or data sources. Accordingly, in some embodiments, attributes from the selected data models or data sources may be displayed enabling authors to selected one or more attributes-of-interest from the displayed attributes. In some embodiments, if authors select attributes, dashboard engines may be arranged to apply one or more inference rules to infer author intent based on the one or more selected attributes.

In one or more of the various embodiments, if an intent may be determined, dashboard engines may be arranged to determine one or more collection specifications that may be associated with the intent.

In one or more of the various embodiments, each collection specification may define one or more visualization types that may be included in corresponding collections that may be based on the collection specifications.

In one or more of the various embodiments, dashboard engines may be arranged to assign attributes from the selected data model/data source to one or more of the visualizations in each collection specification associated with the current intent. In some embodiments, dashboard engines may be arranged to assign one or more eligible attributes from the data source that may not have been explicitly selected by the author. In some embodiments, eligible attributes may be other related attributes in the same data model that may be compatible with a given visualization type. In some cases, for some embodiments, there may two or more eligible attributes for the same visualization type defined in a given dashboard specification. In some embodiments, if this circumstance may occur, dashboard engines may be arranged to generate a visualization for each combination of eligible attributes to determine which combination should be used in the candidate visualization.

Accordingly, in some embodiments, dashboard engines may be arranged to generate interest scores for visualizations made using each combination of eligible attributes. In some embodiments, each visualization type may be associated with interest scoring rules that may be employed to compute interest scores for visualizations based on each combination of eligible attributes. Thus, in some embodiments, combinations may be selected based on their corresponding interest score. For example, for some embodiments, dashboard engines may be arranged to employ one or more statistical metrics such as variance for visualizations with categorical data (e.g., variation in categories between bars in a bar chart), Pearson's correlation coefficient (e.g., to see how strongly two measures are related), smoothed z-scores (e.g., to detect peaks and drops in line charts with time series data), or the like to identify the attributes to choose.

In one or more of the various embodiments, dashboard engines may be arranged to rank collections. In some embodiments, dashboard engines may be configured to associate preference scores that may be determined based on surveying existing dashboard configurations and their associated intents. Thus, in some embodiments, if a dashboard engine infers that the author intent is measuring analysis, preferred collection specifications may be the dashboard specifications associated with measuring analysis. Further, in some embodiments, other features associated with collection specifications or their associated collections may contribute to scores used for ranking/ordering (e.g., classifying) collections. For example, in some embodiments, if the most common measuring dashboards commonly include three particular visualization types, collection specifications that include three of the common visualization types may be scored higher than collection specifications that include fewer of the common visualization types.

In some embodiments, dashboard engines may be arranged to employ various heuristics, statistical scoring, rules, prediction models, or the like, to generate ranking scores for classifying and ranking collection specifications or collections made from collection specifications. In some embodiments, one or more rules or collection specifications may be weighted based on author or organization preferences. Also, in some embodiments, dashboard engines may be arranged to automatically adjust the weights or scores based on author activity.

Accordingly, in some embodiments, as authors interact with user interfaces provided by the dashboard engine, dashboard engines may be arranged to collect one or more metrics associated with author interactions with one or more if the dashboard engine user interfaces, generate dashboards, other dashboard, visualizations included in dashboards, or the like. For example, for some embodiments, if an author selects a time valued attribute, this may trigger the dashboard engine to increase the rank/score that may be associated with collection specifications associated with change analysis. Also, in some embodiments, if authors select particular visualizations from candidate visualizations for use in a dashboard they are authoring, collection specifications (and their derived collections) may be ranked higher than other collection specifications that do not include those selected visualizations or visualization types.

Figure 2:
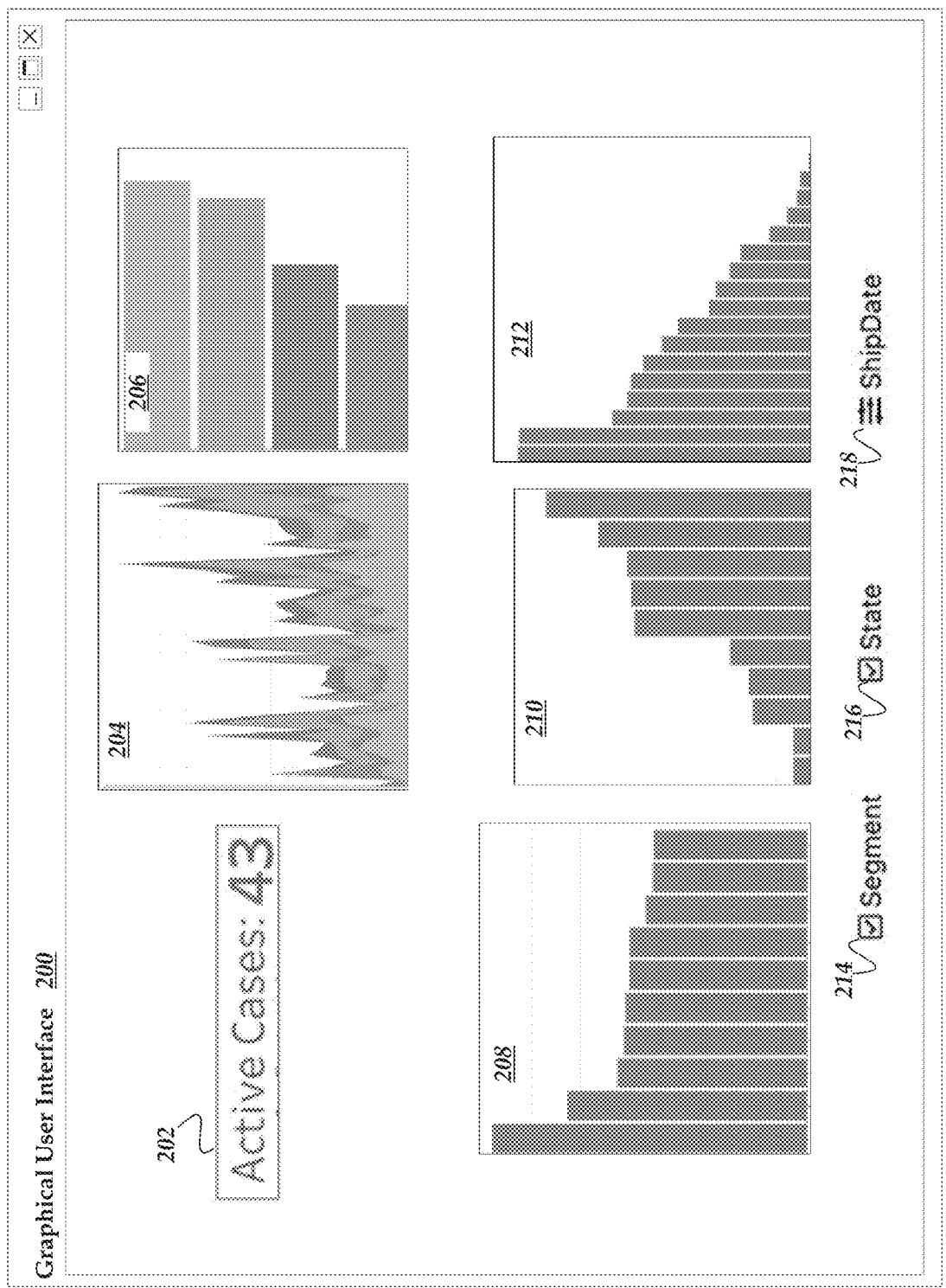
FIG. 2 illustrates a portion of a user interface that may be considered a dashboard in accordance with one or more of the various embodiments.

FIG. 2 illustrates a portion of user interface 200 that may be considered a dashboard in accordance with one or more of the various embodiments. In this example, user interface 200 includes several different visualizations that comprise a dashboard, including, visualization 202, visualization 204, visualization 206, visualization 208, visualization 210, visualization 212, or the like. These visualizations may be considered to represent visualizations of various quantities, measures, KPIs, statuses, or the like. Further, in some cases, for some embodiments, dashboards, such as, dashboard 200 may include one or more controls, represented here by control 214, control 216, or control 218.

In one or more of the various embodiments, user interface 200 may be displayed on one or more hardware displays, such as, client computer displays, mobile device displays, or the like. In some embodiments, user interface 200 may be provided via a native application or as a web application hosted in a web browser or other similar applications. One of ordinary skill in the art will appreciate that for at least clarity or brevity many details common to commercial/production user interfaces have been omitted from user interface 200. Likewise, in some embodiments, user interfaces may be arranged differently than shown depending on local circumstances or local requirements, such as, display type, display resolution, user preferences, or the like. However, one of ordinary skill in the art will appreciate that the disclosure/description of user interface 200 is at least sufficient for disclosing the innovations included herein.

Figure 3:
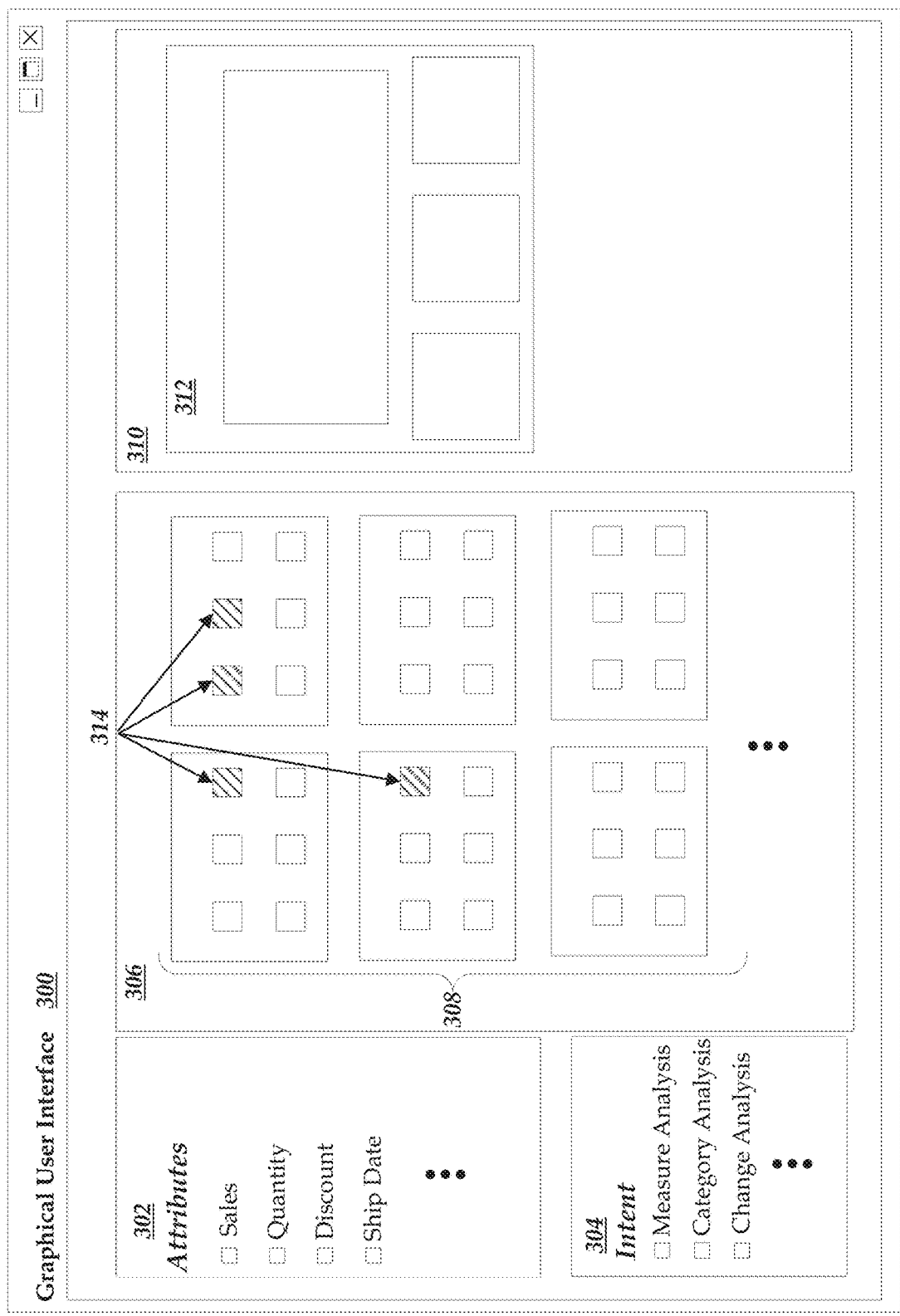
FIG. 3 illustrates a logical representation of a portion of a user interface of intent driven dashboard recommendations in accordance with one or more of the various embodiments.

FIG. 3 illustrates a logical representation of a portion of user interface 300 of intent driven dashboard recommendations in accordance with one or more of the various embodiments. As described above, in some embodiments, dashboard engines may be arranged to provide one or more user interfaces that enable dashboard authors to create dashboards from collections that may be selected based on author intent where intent may be directly expressed by the author or inferred based on attribute selection or other dashboard authoring actions.

In some embodiments, user interface 300 may include multiple panels, including attribute panel 302, intent panel 304, collections panel 306, composition panel 310, or the like. Further, in some embodiments, collection panels, such as, collection panel 306 may display one or more collections, such as, collections 308. In this example, collections are illustrated as showing six collections arranged in three rows of two. The small squares illustrated in each collection represent individual visualizations in each dashboard.

In one or more of the various embodiments, user interface 300 may include composition panels, such as, composition panel 310. Accordingly, in some embodiments, authors may be enabled to select and place one or more visualizations from the collections into a composition dashboard. In some embodiments, authors may be enabled to select an entire collection rather than being limited to selecting individual visualizations from the collections. In this example, composition dashboard 312 represents a dashboard that is in the process of being created by an author. Note, in this example, composition dashboard includes four visualizations that may be assumed to have been selected and placed by a dashboard author. In some embodiments, as visualizations may be selected from collections, dashboard engines may be arranged to indicate in the user interface which visualizations have been selected for inclusion in composition dashboard 310. In this example, for some embodiments, the visualizations pointed to by reference number 314 may be considered to correspond to the visualizations placed in composition dashboard 312.

In one or more of the various embodiments, dashboard engines may be arranged to display one or more collections in rank order based on preference scores that may be inferred based on author intent, selected attributes, or other dashboard authoring activity.

In this example, for some embodiments, attribute panel 302 may be considered to be showing a list of attributes provided from or based on one or more data models or data sources. In some embodiments, user interfaces such as user interface 300 may include user interface controls for selecting one or more data models or data sources that may be accessible by the dashboard engine or visualization platform. In some embodiments, the one or more attributes (if any) that are selected by the author may be indicated in the user interface using emphasis styling, check-boxes, radio buttons, or the like.

Also, in this example, for some embodiments, intent panel 304 may list the one or more intents that may be available or otherwise supported by the dashboard engine. In some embodiments, the inferred or selected intent (if any) may be indicated in the user interface using emphasis styling, check-boxes, radio buttons, or the like.

Figure 4:
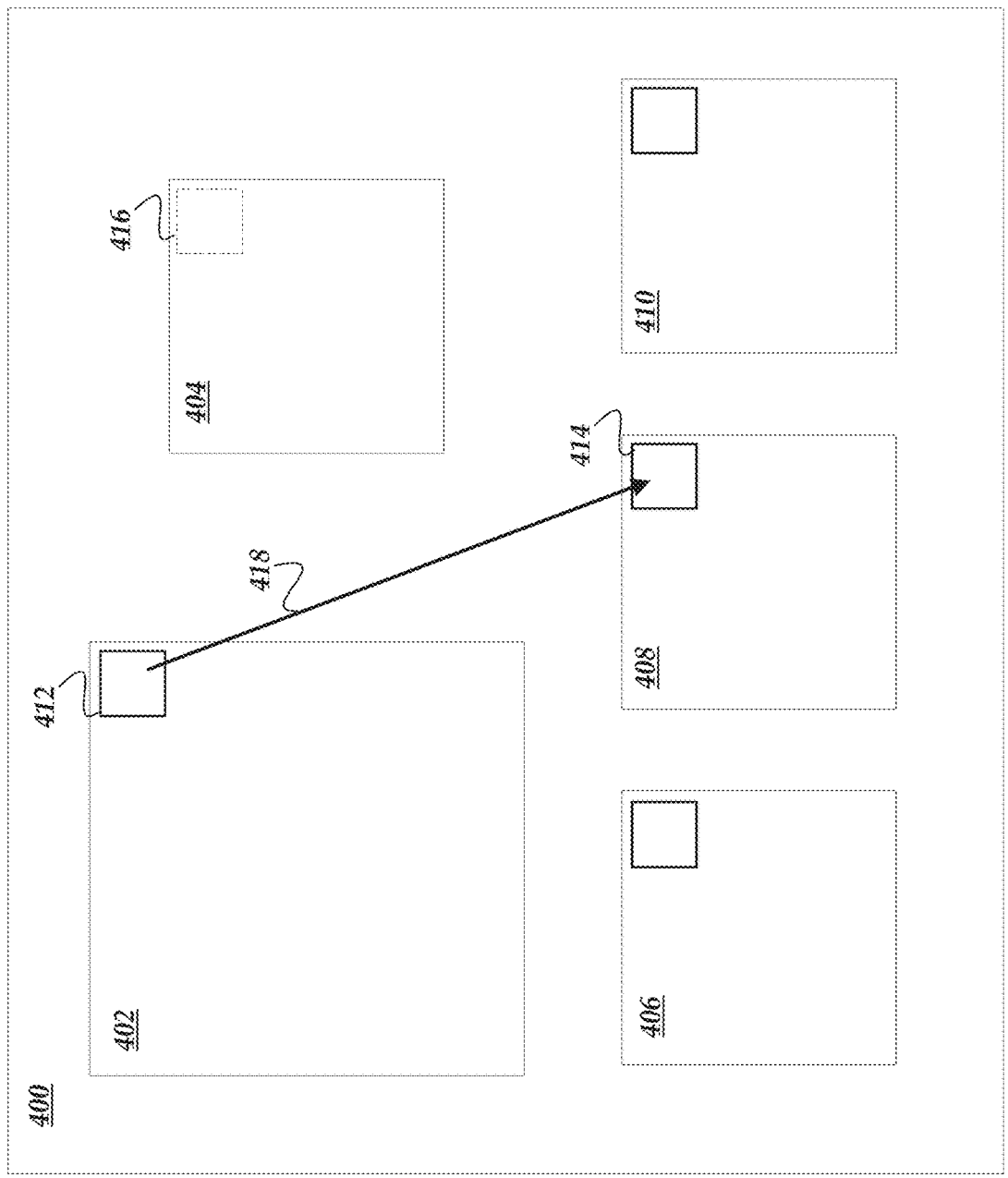
FIG. 4 illustrates a logical representation of a portion of a user interface for intent driven dashboard recommendations in accordance with one or more of the various embodiments.

FIG. 4 illustrates a logical representation of a portion of user interface 400 for intent driven dashboard recommendations in accordance with one or more of the various embodiments. As described above, dashboard engines may be arranged to enable dashboard authors to select, place, or arrange one or more visualizations determined from one or more collections into a composition dashboard such as composition dashboard 400. Accordingly, in some embodiments, if an author finishes authoring the composition dashboard in the composition panel, dashboard engines may be arranged to enable the author to publish the composition dashboard as a 'regular' dashboard that may be viewed by or interacted with by one or more other users or the author. Access rights to the published dashboard or general availability of published dashboards may depend on one or more publishing rules/parameters assigned by the author or other administrators of the visualization platform.

In this example, for some embodiments, visualization 402, visualization 404, visualization 406, visualization 408, visualization 408, or visualization 410 represent visualizations that have been added to composition dashboard 400. In one or more of the various embodiments, dashboard engines may be arranged to enable authors to position or size the visualizations in the composition dashboard. For example, in some cases, authors may be enabled to drag-and-drop visualizations from one or more collections to composition dashboards as part of the dashboard authoring process.

Further, in some embodiments, dashboard engines may be arranged to overlay an interaction indicator on the visualizations displayed in the composition dashboard. In this example, for some embodiments, interaction indicator 412, interaction indicator 414, and interaction indicator 416 may be considered to represent interaction indicators overlaid on visualizations displayed in composition dashboard 400. In one or more of the various embodiments, interaction indicators may correspond to one or more potential interaction relationships (links) that may be enabled between two or more visualizations in the composition dashboard. Accordingly, in some embodiments, dashboard engines may be arranged to employ emphasis styling, icons, user interface controls, colors, or the like, to indicate one or more interactions that may be available for two or more visualizations.

In one or more of the various embodiments, dashboard engines may be arranged to evaluate the attributes that are used each composition visualizations and the underlying data model or data source to identify one or more dimensions (in terms of attributes) that may be shared by composition visualizations.

For example, in some embodiments, interaction relationships among visualizations in a composition dashboard may include one or more of filtering or highlighting. In some embodiments, filtering may remove marks from a target visualization that do not match a selection in a source visualization. Also, in some embodiments, highlighting may preserve all marks in the target view but fade out (e.g., deemphasize) marks that do not match the source visualization selection. Note, one of other skill in the art will appreciate that other interaction relationship may be determined. And, in some embodiments, the availability of particular interaction relationships may vary depending on the available collections, intents, attributes, visualization types, local requirements, local circumstances, or the like. Accordingly, in some embodiments, dashboard engines may be arranged to determine the availability of particular interactions relationships based on configuration information.

FIG. 5 illustrates a portion of data structure 500 that represents a portion of a collection specification for intent driven dashboard recommendations in accordance with one or more of the various embodiments. As described above, in some embodiments, one or more collection specifications may be provided. In some embodiments, collection specifications may declare the visualization types or control types (if any) that may comprise a collection. One of ordinary skill in the art will appreciate that while data structure 500 is represented here using JSON-like syntax, other types of data structures or data description languages may be employed. For example, for some embodiments, collection specifications may be implemented as a set of instructions that directly generate information used for generating collections on-the-fly rather than requiring a predefined specification-like data structure. Likewise, in some embodiments, collection specifications may include more or fewer fields without departing from the scope of these innovations. For example, collection specifications directed to other intents may declare different visualizations or controls.

For brevity and clarity, the parts of collection specification 500 are described here absent reference numbers because the field names themselves are sufficient for referencing the fields described these innovations:

description: A textual description used to describe the contents of collections generated based on the collection specification to the dashboard author (e.g., "Analysis of a single measure across dimensions," "Comparison of two measures," "Year-over-year change analysis").

intent: The intent to which a collection maps (e.g., one of measure, change, category, distribution, or the like).

attrReq: The type and count of data attributes that may be required to populate the visualizations and controls in a collection. For example, a value of "1q, 4c, 1t, 1g" in this field means that this collection requires seven data attributes including one quantitative (q), four categorical (c), one temporal (t), and one geographic (g).

visualizations: List of visualization declarations in a collection.

visualization: a visualization declaration for a visualization that may be included in the collection.

id: A unique identifier assigned to each visualization within a collection.

type: Visualization type (e.g., bar chart, line chart, treemap, or the like).

attrs: The type and count of data attributes required of a visualization. For example, for some embodiments, for a single bar chart, this field has the value "q, c" indicating that the visualization shows one quantitative measure (q) across the values for a categorical attribute (c).

spec: The visualization specification or visualization model used to define the visualization that may be rendered if the collection is displayed.

controls: List of controls in a collection.

control: a control declaration for a control that may be included in the collection.

id: A unique identifier assigned to each control within a collection.

type: control type (e.g., dropdown, range slider).

attr: The attribute type represented by the control (e.g., range sliders may allow manipulating quantitative attribute values or a time range, dropdown menus may allow selecting categorical attribute values, or the like).

Generalized Operations

FIGS. 6-12 represents generalized operations for intent driven dashboard recommendations in accordance with one or more of the various embodiments. In one or more of the various embodiments, processes 600, 700, 800, 900, 1000, 1100, and 1200 described in conjunction with FIGS. 6-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 6-12 may be used for intent driven dashboard recommendations in accordance with at least one of the various embodiments or architectures such as those described in conjunction with FIGS. 1-5. Further, in one or more of the various embodiments, some or all of the actions performed by processes 600, 700, 800, 900, 1000, 1100, and 1200 may be executed in part by visualization engine 1522, dashboard engine 1524, or the like, running on one or more processors of one or more network computers.

Figure 6:
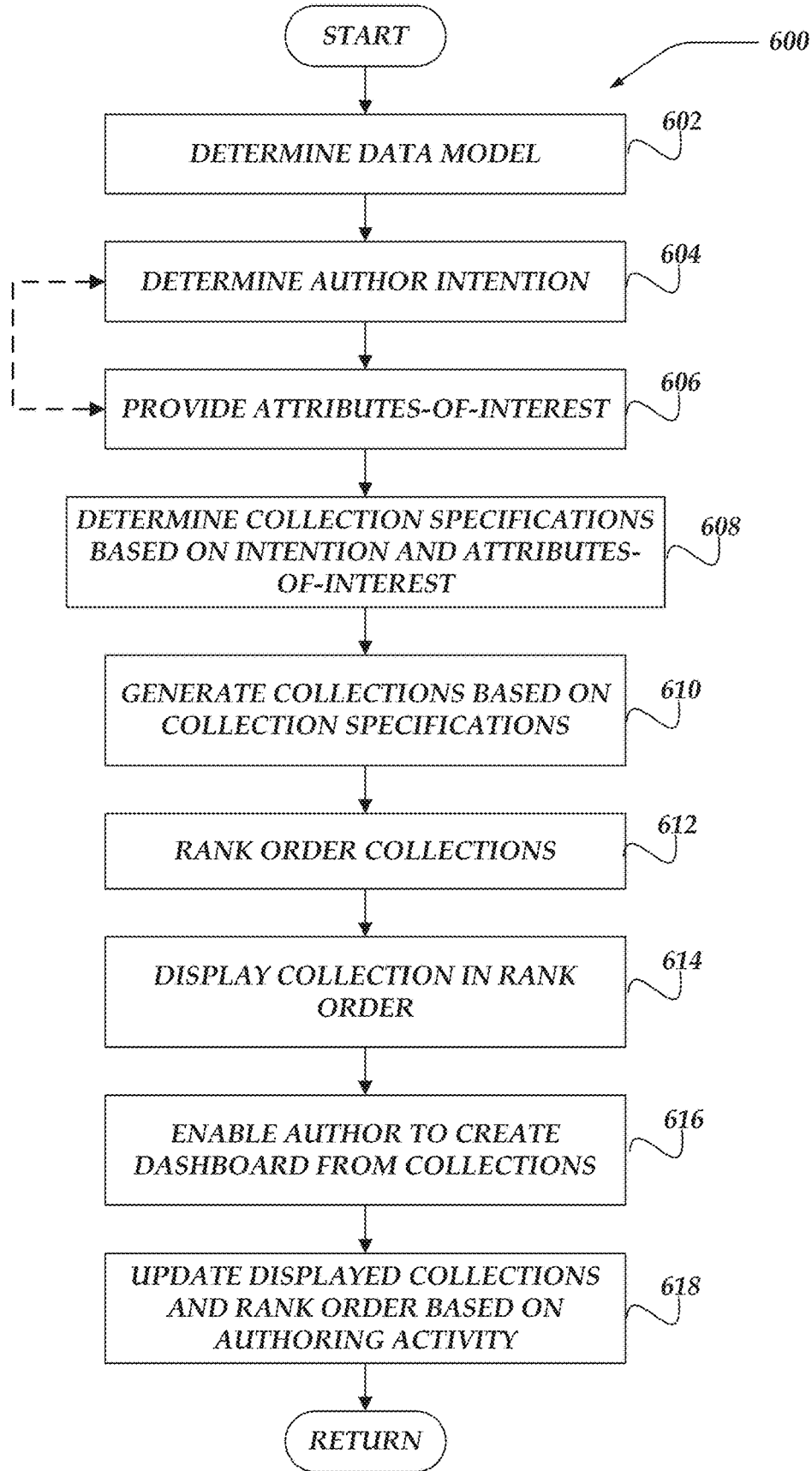
FIG. 6 illustrates an overview flowchart for a process for intent driven dashboard recommendations in accordance with one or more of the various embodiments.

FIG. 6 illustrates an overview flowchart for process 600 for intent driven dashboard recommendations in accordance with one or more of the various embodiments. After a start block, at block 602, in one or more of the various embodiments, dashboard engines may be arranged to determine a data model. At block 604, in one or more of the various embodiments, dashboard engines may be arranged to determine an intent of a dashboard author. At block 606, in one or more of the various embodiments, dashboard engines may be arranged to provide one or more attributes-of-interest. Note, in some embodiments, the order of execution of block 604 or block 606 may be reversed. Also, as described herein, author intent may be modified in response to author activity. At block 608, in one or more of the various embodiments, dashboard engines may be arranged to determine one or more collection specifications based on the intent and one or more attributes-of-interest. At block 610, in one or more of the various embodiments, dashboard engines may be arranged to generate one or more collections based on the one or more collection specifications. At block

612, in one or more of the various embodiments, dashboard engines may be arranged to rank order the one or more collections. At block 614, in one or more of the various embodiments, dashboard engines may be arranged to display one or more collections in rank order. At block 616, in one or more of the various embodiments, dashboard engines may be arranged to enable authors to create a dashboard from the one or more collections. At block 618, in one or more of the various embodiments, dashboard engines may be arranged to update the displayed collections and update the rank order of the collections based on dashboard authoring activity. Next, in one or more of the various embodiments, control may be returned to a calling process.

Figure 7:
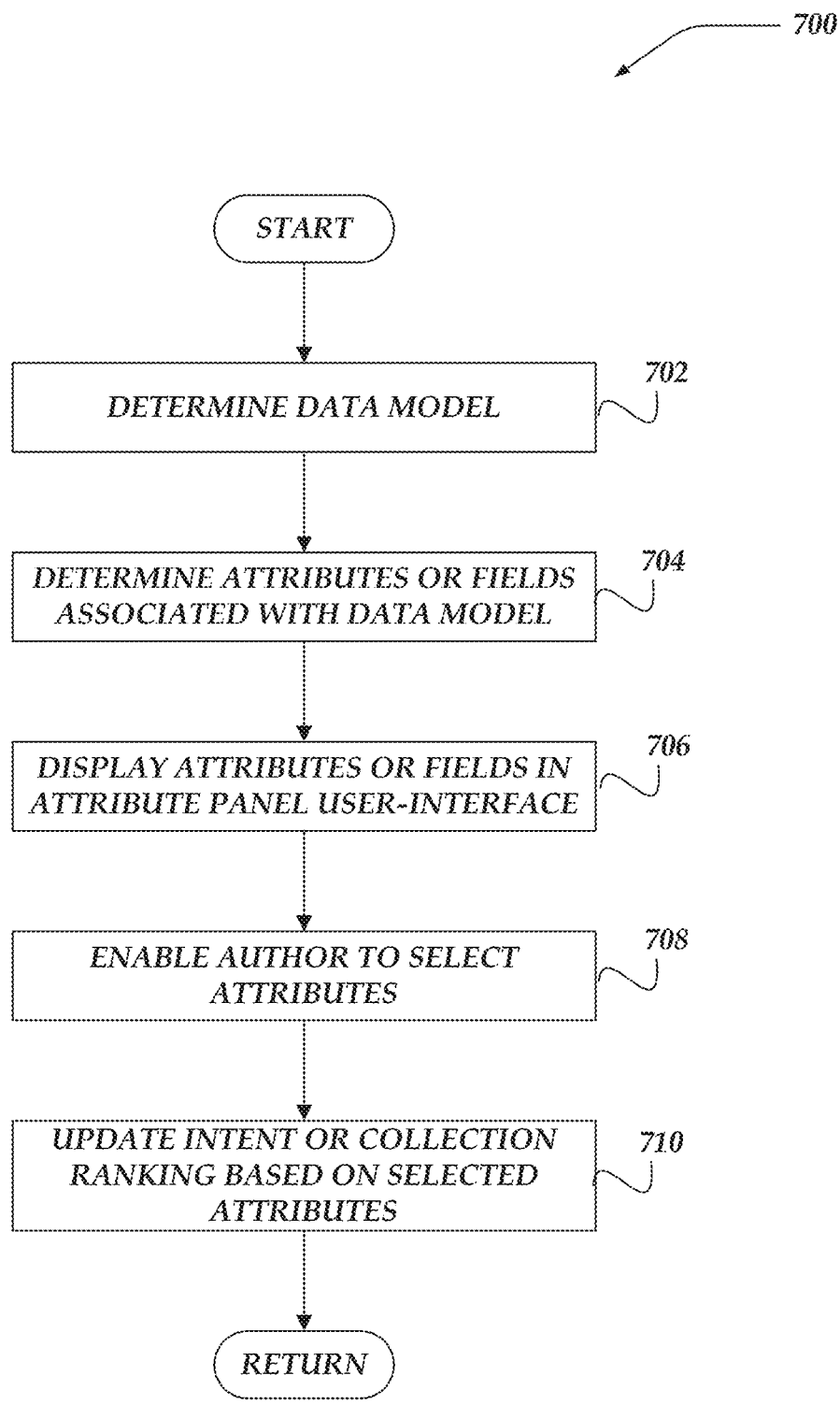
FIG. 7 illustrates a flowchart for a process for intent driven dashboard recommendations in accordance with one or more of the various embodiments.

FIG. 7 illustrates a flowchart for process 700 for intent driven dashboard recommendations in accordance with one or more of the various embodiments. After a start block, at block 702, in one or more of the various embodiments, dashboard engines may be arranged to determine a data model or data source. In one or more of the various embodiments, dashboard engines may be arranged to provide one or more user interfaces that enable dashboard authors to select a data model or data source that contains the data the dashboard engine may be interested in analyzing. In some embodiments, dashboard engines may be configured to automatically select a default data model or default data source.

At block 704, in some embodiments, dashboard engines may be arranged to determine one or more attributes or fields associated with the data model. In one or more of the various embodiments, data models may define one or more data objects that each may have one or more attributes. In some embodiments, dashboard engines may be arranged to determined labels or description of the one or more attributes in the current data model. In some embodiments, one or more data objects, one or more attribute types (e.g., data types), one or more attributes, or the like, may be excluded from consideration. For example, in some embodiments, one or more attributes or data objects may be associated with meta-data, or the like, rather than measurable data. Accordingly, in one or more of the various embodiments, dashboard engines may be arranged to employ one or more rules, filters, or the like, provided via configuration information to determine which data objects, attributes, should be determined from a data source or data model.

At block 706, in one or more of the various embodiments, dashboard engines may be arranged to display the one or more attributes in an attribute panel in a user interface. As described above, dashboard engines may display labels or descriptions that correspond to the one or more determined attributes in an attribute panel, or the like.

At block 708, in one or more of the various embodiments, dashboard engines may be arranged to enable authors to select one or more attributes in the attribute panel. In one or more of the various embodiments, dashboard engines may be arranged to provide user interfaces, such as, an attribute panel that enable dashboard authors to select one or more attributes.

At block 710, in one or more of the various embodiments, dashboard engines may be arranged to update one or more of the intent or collection ranking based on the selected one or more attributes.

Next, in one or more of the various embodiments, control may be returned to a calling process.

Figure 8:
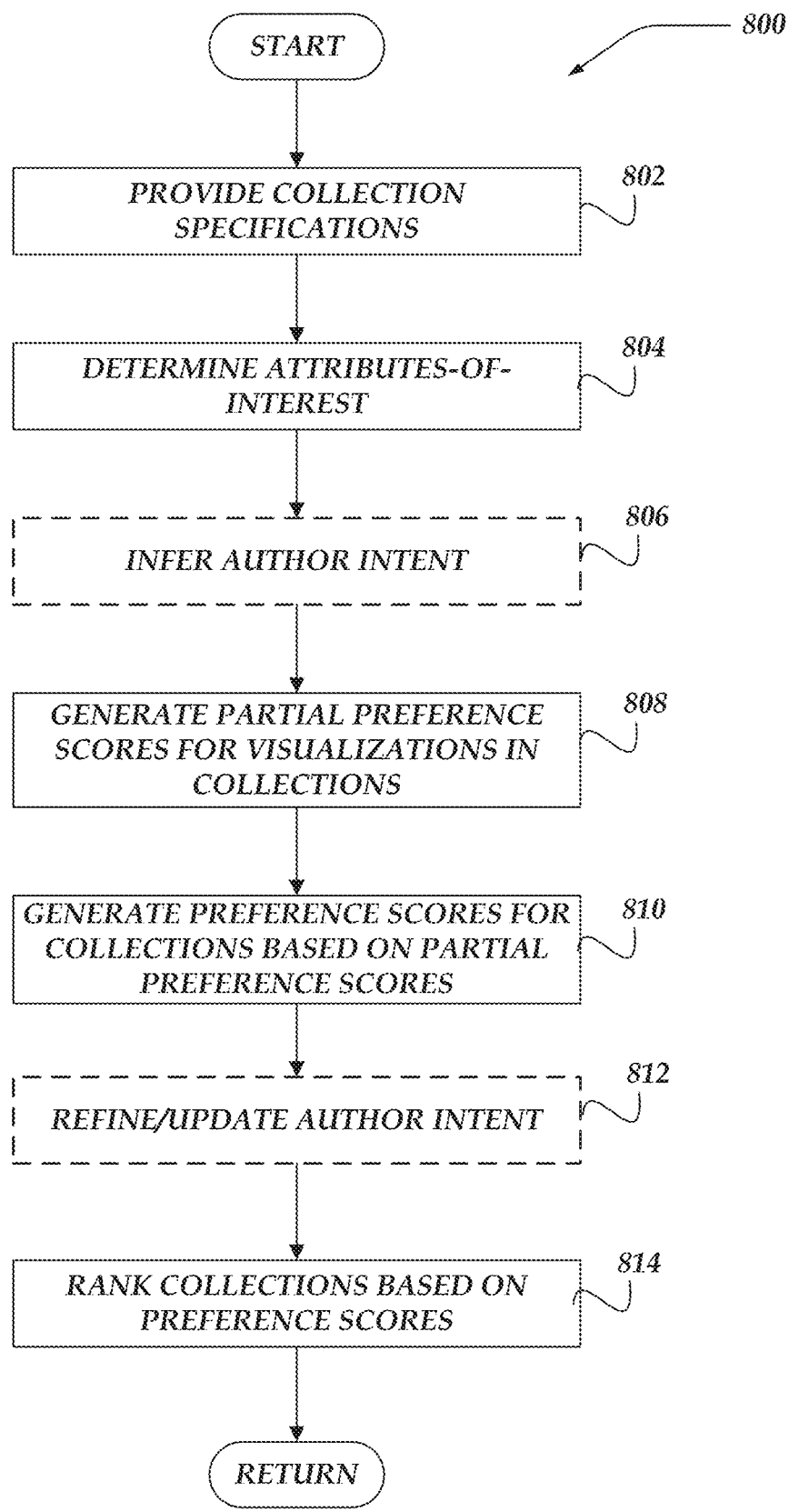
FIG. 8 illustrates a flowchart for a process for intent driven dashboard recommendations in accordance with one or more of the various embodiments.

FIG. 8 illustrates a flowchart for process 800 for intent driven dashboard recommendations in accordance with one or more of the various embodiments. After a start block, at block 802, in one or more of the various embodiments, dashboard engines may be arranged to provide one or more collection specifications. In one or more of the various embodiments, one or more collection specifications that declare one or more visualizations may be predefined. Accordingly, in some embodiments, collection specifications may be provided from one or more of a database, a file system, system memory, configuration information, or the like.

As described above, in some embodiments, collection specifications may include one or more visualization declarations that define visualization types, required attribute types, eligible attribute types, or the like, for visualizations that may be included in collections. Also, in some embodiments, collection specifications may include one or more visualization specifications or visualization models that define the appearance, styling, or other features for the visualizations that may be included collections. In some embodiments, collection specifications may include references/links to visualization specifications or visualization models for each visualization declaration declared in collection specifications.

Also, in some embodiments, collection specifications may be directed to one or more intents or one or more sub-intents. In some embodiments, dashboard engines may be provided one or more collection specifications from configuration information. Thus, in some embodiments, as new collection specifications may be determined they may be made available to visualization platforms. In some embodiments, the particular collection specifications that may be available may depend on other considerations, such as, user preference, license considerations, or the like. Also, in some embodiments, users (or visualization platform administrators) may be enabled to define one or more custom collection specifications.

At block 804, in one or more of the various embodiments, dashboard engines may be arranged to determine one or more attributes-of-interest. As described above, in some embodiments, dashboard engines may be arranged to provide user interfaces, such as, an attribute panel that enables dashboard authors to indicate one or more attributes-of-interest. For example, in some embodiments, dashboard authors may select one or more attributes from an attribute panel.

At block 806, in one or more of the various embodiments, optionally, dashboard engines may be arranged to determine the intent of the author. In one or more of the various embodiments, dashboard engines may be arranged to infer the intent or sub-intent of dashboard authors based on the attributes-of-interest.

In one or more of the various embodiments, dashboard engines may be arranged to infer intents or sub-intents based on the attributes of interest. Accordingly, in some embodiments, dashboard engines may be arranged to employ one or more rules, instructions, predictive models, or the like, that may map attribute types (e.g., attributes-of-interest) to intents or sub-intents. In some embodiments, such rules, instructions, or predictive models may be adapted as new collection specifications, new attribute types, new intents, new sub-intents, or the like, may be introduced to the visualization platform. Accordingly, in some embodiments, dashboard engines may be arranged to employ rules, instructions, or predictive models provided via configuration information to infer dashboard author intents or sub-intents.

Note, this block is indicated as being optional because in some cases a dashboard author may explicitly declare an intent or sub-intent.

At block 808, in one or more of the various embodiments, dashboard engines may be arranged to generate one or more partial preference scores associated with visualization declarations declared in the one or more collection specifications.

In one or more of the various embodiments, collection specifications may declare one or more visualization declarations or one or more control declarations. As described above, in some embodiments, among other things, these declarations may define required attribute types, optional attribute types, numbers of attributes, or the like.

Accordingly, in some embodiments, dashboard engines may be arranged to generate partial preference scores for each visualization included in a collection based on the quality of match with the attributes-of-interest.

In one or more of the various embodiments, one or more declared visualization declarations (in a given collection specification) may be excluded from consideration if the attributes-of-interest, other attributes in the data model, or the like, may be incompatible with the excluded visualizations.

At block 810, in one or more of the various embodiments, dashboard engines may be arranged to generate a preference score for each collection based on the one or more partial preference scores.

In one or more of the various embodiments, dashboard engines may be arranged to assign each collection a preference score based on the partial preference scores associated with its declared visualizations. In some cases, dashboard engines may be configured to disqualify collections that include visualizations that are incompatible with the current data model or attributes-of-interest. Also, in some embodiments, dashboard engines may be configured score such collections and omit the incompatible visualizations from rendering or display.

At block 812, in one or more of the various embodiments, optionally, dashboard engines may be arranged to refine or update dashboard author intent.

In one or more of the various embodiments, dashboard engines may be arranged to update the inferred intent based on the preference scores associated with the collections. For example, in some embodiments, if the current intent may be inconsistent with the highest scoring collections, dashboard engines may be arranged to change to inferred intent to match the highest score collections.

Note, this block is indicated as being optional because in some cases the dashboard author may explicitly declare an intent or sub-intent.

At block 814, in one or more of the various embodiments, dashboard engines may be arranged to classify the rank of the one or more collections based on their corresponding preference scores.

Next, in one or more of the various embodiments, control may be returned to a calling process.

Figure 9:
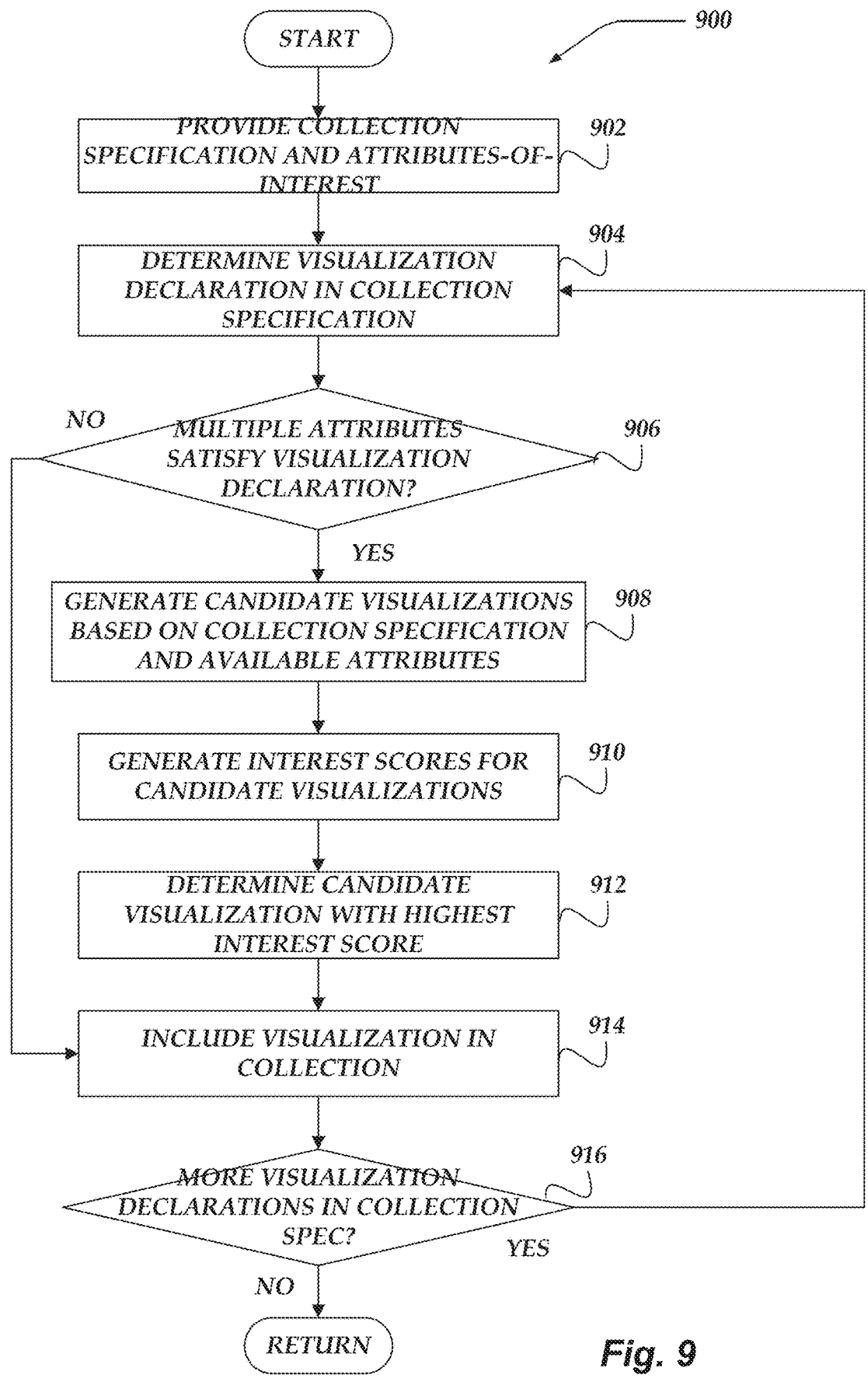
FIG. 9 illustrates a flowchart for a process for intent driven dashboard recommendations in accordance with one or more of the various embodiments.

FIG. 9 illustrates a flowchart for process 900 for intent driven dashboard recommendations in accordance with one or more of the various embodiments. After a start block, at block 902, in one or more of the various embodiments, dashboard engines may be arranged to provide a collection specification and one or more attributes-of-interest. In one or more of the various embodiments, one or more collection specifications that declare one or more visualizations may be predefined. Accordingly, in some embodiments, collection specifications may be provided from one or more of a database, a file system, configuration information, system memory, or the like.

As described above, in some embodiments, collection specifications may declare one or more visualization declarations that define visualization types, required attribute types, eligible attribute types, or the like. Also, in some embodiments, collection specifications may include one or more visualization specifications or visualization models that define the appearance, styling, or other features for the visualizations that may be included collections. In some embodiments, collection specifications may include reference/links to visualization specification or visualization models for each visualization declaration declared in collection specifications. Further, in some embodiments, as described above, collection specifications may include a mapping to one or more intents or sub-intents.

Also, in some embodiments, dashboard engines may be provided one or more attributes-of-interest that may be selected by the dashboard author or in some cases provided as defaults.

At block 904, in one or more of the various embodiments, dashboard engines may be arranged to determine one or more visualization declarations in the collection specification. In one or more of the various embodiments, dashboard engines may be arranged to iterate through to visualization declarations in each collection specification.

At decision block 906, in one or more of the various embodiments, if multiple attributes-of-interest may be available for a visualization declaration, control may flow to block 908; otherwise, control may flow to block 914.

In some embodiments, collection specifications may declare one or more visualizations that require additional attributes from the data model in addition to the attributes provided by the dashboard author to render the visualization. In some cases, there may be more t qualified attributes available in the data model than required to render a visualization. Accordingly, in some embodiments, dashboard engines may be arranged to evaluate the declared visualizations using the different attribute combinations to determine which non-selected attributes to use if rendering or displaying the visualization in collection.

At block 908, in one or more of the various embodiments, dashboard engines may be arranged to generate one or more candidate visualizations based on the collection specification and the available attributes-of-interest.

In preparation for scoring each eligible attribute combination, dashboard engines may be arranged to generate a non-displayed instance of the declared visualization. Note, in some embodiments, this may entail determining one or more marks or mark values that would be rendered if the candidate visualization is rendered in a collection. Accordingly, in some embodiments, dashboard engines may be arranged to employ each eligible attribute combination to populate a candidate visualization that may be evaluated for interest. Note, in some embodiments, candidate visualizations may be considered to be data structures and values that may correspond to visualization declarations and a combination of eligible attributes rather than being an actual visualization that is rendered by the visualization engine or dashboard engine for display to users or dashboard authors.

At block 910, in one or more of the various embodiments, dashboard engines may be arranged to generate interest scores for the one or more candidate visualizations.

In one or more of the various embodiments, attributes may be associated with a base interest score based on the current intent or sub-intent. Likewise, in some embodiments, other authoring interactions, such as, visualizations already added to the composition dashboard, interaction links defined in the composition dashboard, or the like, may have resulted in modifications (increases or decreases) to the interest score associated with individual attributes.

Thus, in some cases, for some embodiments, dashboard engines may be arranged to determine that attribute combinations that may be associated with the highest interest by direct comparison of the interest scores associated with each combination of attributes.

However, in some cases, for some embodiments, the interest scores associated with each eligible combination of attributes may be the same. Accordingly, in some embodiments, dashboard engines may be arranged to employ one or more statistical metrics such as variance for charts with categorical data (e.g., variation in categories between bars in a bar chart), Pearson's correlation coefficient (e.g., to see how strongly two measures are related), smoothed z-scores (e.g, to detect peaks and drops in line charts with time series data), or the like, to determine interest scores for attribute combinations.

At block 912, in one or more of the various embodiments, dashboard engines may be arranged to determine a candidate visualization with a highest interest score.

In one or more of the various embodiments, dashboard engines may be arranged to determine which eligible attribute combination to assign to a declared visualization based on determining the combination of attributes with the highest interest score.

At block 914, in one or more of the various embodiments, dashboard engines may be arranged to include the determined visualization in the collection.

In one or more of the various embodiments, if there was more than one eligible attribute combination for a visualization, dashboard engines may choose the combination of attributes associated with the highest interest score, otherwise, the visualization may be generated based on the one available eligible combination of attributes.

Note, in some embodiments, visualization specifications or visualization models associated with a declared visualization may define one or more styles, colors, decorations, or the like, that may be included in the visualization as well depending on the specific visualization specification or visualization model.

At decision block 916, in one or more of the various embodiments, if there may be more visualization declarations in the collection specification, control may loop back to block 904; otherwise, control may be returned to a calling process.

As described above, collection specifications may include more than one visualization declaration. Accordingly, in some embodiments, dashboard engines may be arranged to process each visualization in the collection specification. In some embodiments, dashboard engines may be arranged to process the visualizations declared in a collection specification in sequence or in parallel.

Figure 10:
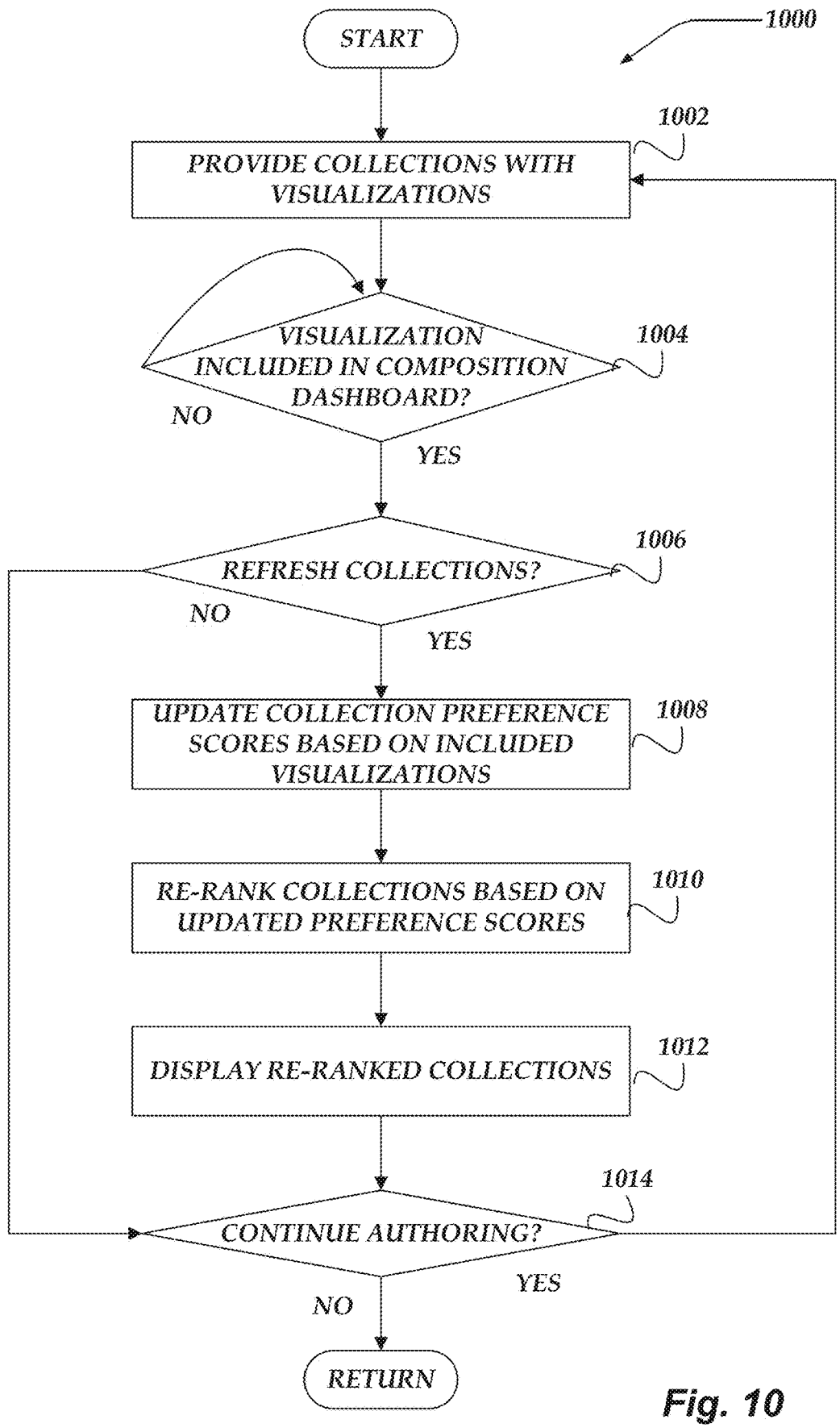
FIG. 10 illustrates a flowchart for a process for intent driven dashboard recommendations in accordance with one or more of the various embodiments.

FIG. 10 illustrates a flowchart for process 1000 for intent driven dashboard recommendations in accordance with one or more of the various embodiments. After a start block, at block 1002, in one or more of the various embodiments, dashboard engines may be arranged to provide one or more collections that each may include one or more visualization or one or more controls. As described above, in some embodiments, dashboard engines may be arranged to display one or more collections in a collection panel. In some embodiments, the display order of the one or more collections may be based on a classification that ranks the collections based on author preference scores. Further, in some embodiments, each collection may include one or more visualizations. Also, in some embodiments, collections may include one or more controls associated with the one or more visualizations. As described above, the visualization or controls included in a collection may be based on a collection specification, one or more selected attributes, or the like.

At decision block 1004, in one or more of the various embodiments, if a visualization or control may be included in a composition dashboard, control may flow to decision block 1006. In one or more of the various embodiments, dashboard engines may be arranged to enable dashboard authors to select one or more visualizations or one or more controls from collections to add to a composition dashboard.

At decision block 1006, in one or more of the various embodiments, if the collections may be refreshed, control may flow to block 1008; otherwise, control may flow to decision block 1014. In one or more of the various embodiments, dashboard engines may be arranged to enable dashboard authors to decide if they want to refresh the displayed collections. In some embodiments, refreshing the collection may result in a different display order of the collections. Likewise, in some embodiments, one or more new collections may be displayed while one or more previously displayed collections may be hidden/removed from display. Accordingly, in some embodiments, dashboard engines may enable dashboard authors to actively determine if the collections may be refreshed.

At block 1008, in one or more of the various embodiments, dashboard engines may be arranged to update preference scores associated with the one or more collections.

In one or more of the various embodiments, dashboard engines may be arranged to infer one or more preference changes based on the selection of the one or more visualizations or controls. For example, in some embodiments, if a visualization is placed in the composition dashboard, the dashboard engine may infer that the visualization may be of greater interest to the dashboard author than the visualizations that were not selected.

In one or more of the various embodiments, dashboard engines may be arranged to update the weight or interest score derived from one or more attributes associated with the visualization that may be included in the composition dashboard. Also, in some embodiments, dashboard engines may be arranged to update the weight of interest scores of visualization types that may be included in the composition dashboard. Further, in some embodiments, dashboard engines may be arranged to increase the preference score for one or more collections that may be associated with the visualizations selected for inclusion in the composition dashboard.

At block 1010, in one or more of the various embodiments, dashboard engines may be arranged to re-rank the one or more collections based on the updated preference scores.

In one or more of the various embodiments, if the inclusion of the visualizations results in changes in preference score or interest scores, dashboard engines may be arranged to re-rank the collections.

Also, in some embodiments, dashboard engines may be arranged to infer an updated author intent or sub-intent based on the selection of visualizations. Accordingly, in some embodiments, one or more intents or sub-intents may be emphasized or de-emphasized depending on which visualization may be included in the composition dashboard.

In some embodiments, the rules for determining increased preference or decreased preference in response to including visualizations in collections may vary depending on the type of visualization, subject matter, or the like. Accordingly, in some embodiments, dashboard engines may be arranged to determine such rules or instructions based on configuration information to account for local requirements or local circumstances. Likewise, as different collections, different types of visualizations, different attribute types, or the like, may be introduced to visualization platforms, the rules may be updated as necessary.

At block 1012, in one or more of the various embodiments, dashboard engines may be arranged to display to one or more re-ranked collections. Accordingly, in some embodiments, dashboard engines may be arranged to display the collections in a collection panel (user-interface) in rank order. Note, in some cases, one or more low-ranked or unranked collections may be deliberately displayed out of order even though their ranking may not merit display. Thus, in some embodiments, dashboard authors may be presented with collections/visualizations that may not have been considered for intents that may not have been considered.

At decision block 1014, in one or more of the various embodiments, if authoring continues, control may loop back to block 1002; otherwise, control may be returned to a calling process. As described herein, dashboard engines may be arranged to provide an interactive dashboard authoring environment. Thus, in some embodiments, dashboard authors may be enabled to perform authoring actions described herein until they decide to finish.

Figure 11:
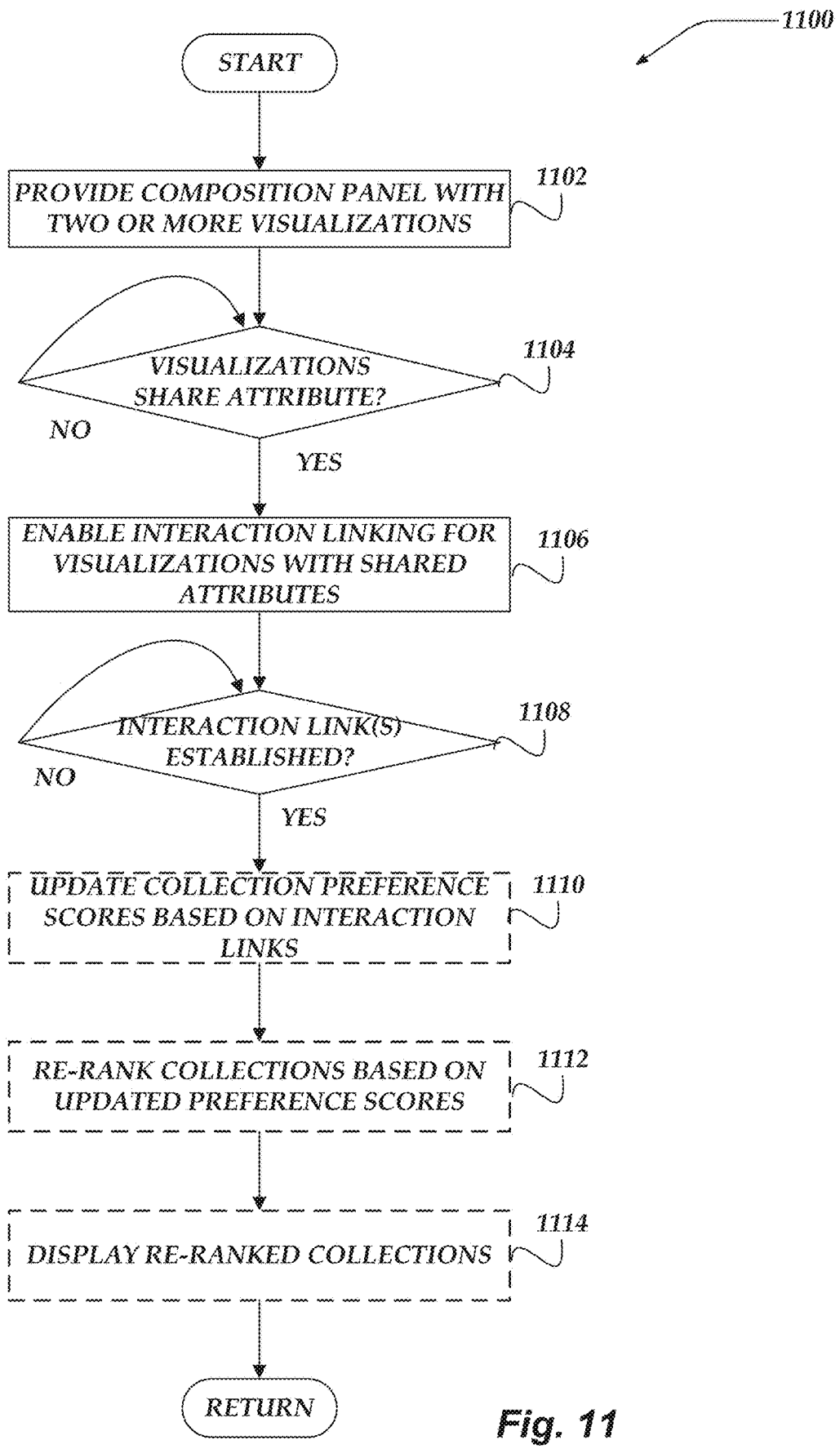
FIG. 11 illustrates a flowchart for a process for intent driven dashboard recommendations in accordance with one or more of the various embodiments.

FIG. 11 illustrates a flowchart for process 1100 for intent driven dashboard recommendations in accordance with one or more of the various embodiments. After a start block, at block 1102, in one or more of the various embodiments, a composition dashboard that includes two or more visualizations may be provided. As described above, in some embodiments, dashboard engines may be arranged to provide user interfaces that enable dashboard authors to select one or more visualizations or one or more controls from the one or more collections displayed in the collection panel of the user interface.

At decision block 1104, in one or more of the various embodiments, if two or more of visualizations share one or more attributes, control may flow to block 1106; otherwise, control may loop back to decision block 1104. In one or more of the various embodiments, one or more visualizations may be related based on shared or associated attributes. For examples, in one or more of the various embodiments, one or more attributes represented in one visualization may be represented different in another visualization. Likewise, for example, in some cases, one visualization may be based on aggregate values of attributes while another visualization breakdowns the same attributes by categories or time periods.

Also, in some embodiments, in some cases, one or more visualizations in the composition dashboard may be interactive such that the users of a published dashboard may be enabled to select parts of the visualizations to focus on various features of the represented data. For example, in some embodiments, one visualization may be a political map of the United States using different colors to represent a distribution of data/value across the states. And, for example, another visualization may represent the same data/values across time periods rather than geographic areas. Thus, in this example, the two different visualizations may be considered to share one or more attributes.

Further, in some embodiments, one or more shared attributes may be hidden or not directly represented in the visualizations. Thus, in some embodiments, some attributes may be shared in the underlying data models used by the visualizations rather than being directly represented in the visualizations as viewed by a user.

At block 1106, in one or more of the various embodiments, dashboard engines may be arranged to enable interaction linking for the two or more visualization that share attributes.

In one or more of the various embodiments, dashboard engines may be arranged to provide one or more user interface controls that enable dashboard authors to identify which visualizations in the composition dashboard may have shared attributes or shared dimensions. In some embodiments, dashboard engines may be arranged to activate one or more visible indicators related to linking two or more visualizations if a first visualization is selected. For example, if a dashboard author selects a visualization in the composition dashboard, if other visualizations in the same composition dashboard may be eligible for linking, the dashboard engine may display icons on the one or more visualizations that may be eligible for linking. Likewise, in some embodiments, if one or more visualization in the composition dashboard may be ineligible for linking, the dashboard engine may be arranged to display an icon or other indicator that represents which visualizations may be ineligible.

In some embodiments, dashboard engines may be arranged to employ one or more rules or instructions for determining if visualizations may be eligible for linking based on more characteristics of the one or more visualizations. For example, in some embodiments, visualizations that are associated with one or more particular attributes, one or more particular attribute types, one or more particular visualization types, or the like, may be deliberately excluded from linking consideration. Accordingly, in some embodiments, dashboard engines may be arranged to employ one or more rules or instructions provided via configuration information to determine linking eligibility to account for local requirements or local circumstances.

At decision block 1108, in one or more of the various embodiments, if one or more interaction links may be established, control may flow to block 1110; otherwise, control may loop back to decision block 1108. In one or more of the various embodiments, dashboard engines may be arranged to provide one or more user interface controls that enable dashboard authors to declare if links should be established between one or more visualizations in the composition dashboard.

At block 1110, in one or more of the various embodiments, optionally, dashboard engines may be arranged to update the collection preference scores associated with one or more collections.

In one or more of the various embodiments, dashboard engines may be arranged to infer one or more preference changes based on which visualization may be linked together.

For example, in some embodiments, if two linked visualizations share an attribute, dashboard engines may be arranged to infer that the shared attribute may be of more interest to the dashboard author than other attributes.

Accordingly, in one or more of the various embodiments, dashboard engines may be arranged to update the weight or interest scores of one or more attributes associated with linked visualizations. Also, in some embodiments, dashboard engines may be arranged to update the weight of interest scores of visualization types that may be linked.

Note, this block is indicated as being optional because in some embodiments the updating the preference score of collections may be deferred until requested or initiated by the dashboard author.

At block 1112, in one or more of the various embodiments, optionally, dashboard engines may be arranged to re-rank the one or more collections based on the updated interest scores.

In one or more of the various embodiments, if the linking of the visualizations may be determined to result in changes in author preference or author interest, dashboard engines may be arranged to re-rank the collections.

Also, in some embodiments, dashboard engines may be arranged to infer an updated author intent or sub-intent based on the linking of visualizations. Accordingly, in some embodiments, one or more intents or sub-intents may be emphasized or de-emphasized depending on which visualizations are linked together.

In some embodiments, the rules for determining increased preference or decreased preference in response to visualization linking may vary depending on the type of visualization, local requirements, local preferences, or the like. Accordingly, in some embodiments, dashboard engines may be arranged to determine such rules or instructions based on configuration information to account for local requirements or local circumstances. Likewise, as different types of visualizations, attributes, or link actions may be introduced to the visualization platforms, the rules may be updated as necessary.

Note, this block is indicated as being optional because in some embodiments the re-ranking of collections may be deferred until requested or initiated by the dashboard author.

At block 1114, in one or more of the various embodiments, optionally, dashboard engines may be arranged to display the re-ranked collections. Accordingly, in some embodiments, dashboard engines may be arranged to display the collections in the collection panel in rank order.

Note, this block is indicated as being optional because in some embodiments the display of the re-ranked (re-sorted) collections may be deferred until requested or initiated by the dashboard author.

Next, in one or more of the various embodiments, control may be returned to a calling process.

Figure 12:
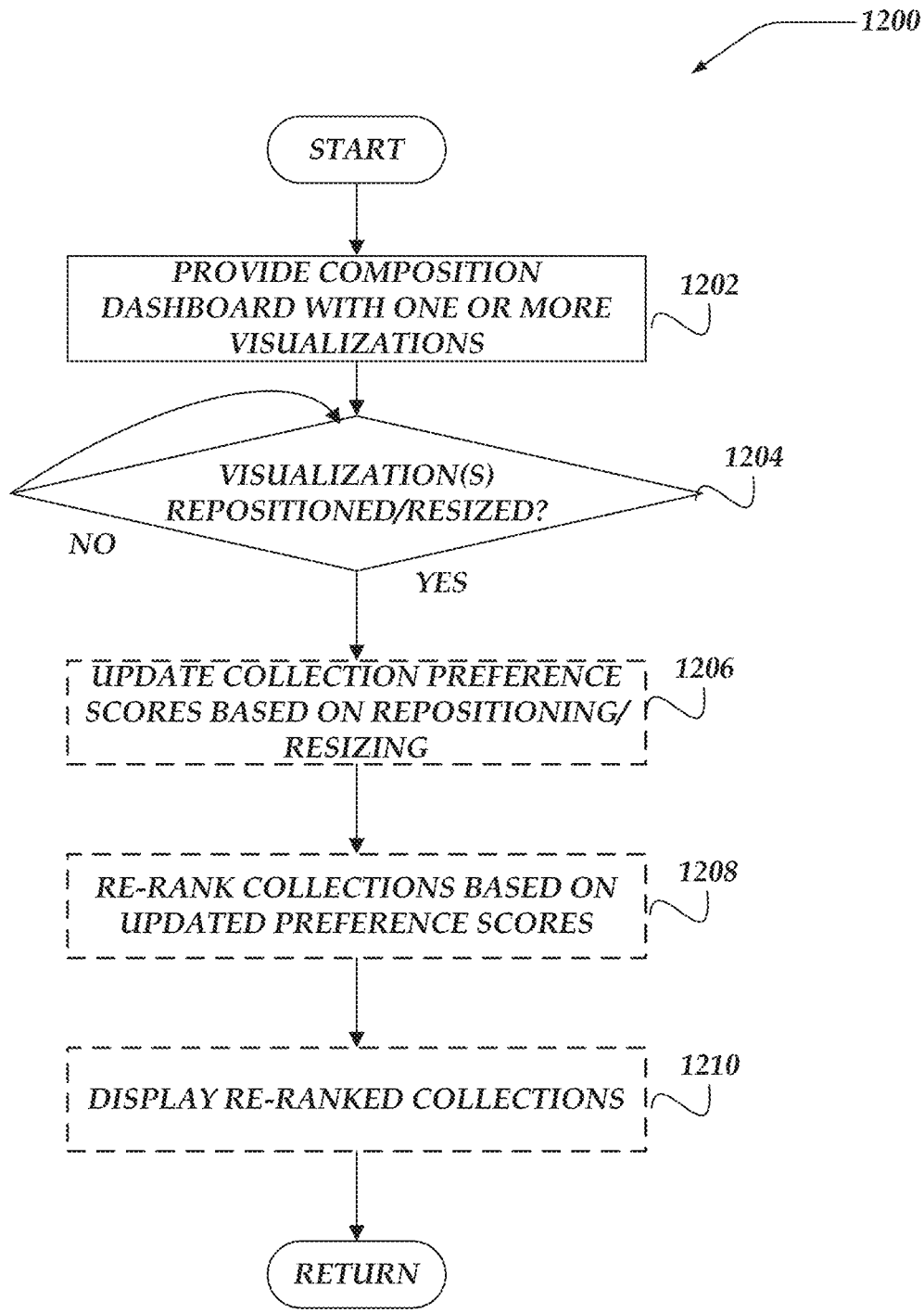
FIG. 12 illustrates a flowchart for a process for intent driven dashboard recommendations in accordance with one or more of the various embodiments.

FIG. 12 illustrates a flowchart for process 1200 for intent driven dashboard recommendations in accordance with one or more of the various embodiments. After a start block, at block 1202, in one or more of the various embodiments, a composition dashboard the includes one or more visualizations may be provided. As described above, in some embodiments, dashboard engines may be arranged to provide user interfaces that enable dashboard authors to select one or more visualizations or one or more controls from the one or more collections that are displayed in the collection panel of the user interface.

At decision block 1204, in one or more of the various embodiments, if one or more of the visualizations (or controls) may be repositioned or resized, control may flow to block 1206; otherwise, control may loop back to decision block 1204. In one or more of the various embodiments, as described herein, dashboard engines may enable dashboard authors to select visualizations or controls from one or more collections that may be placed in the composition dashboard. Further, as mentioned above, in some embodiments, the act selecting a visualization or control from a collection and placing it in the composition dashboard may result in the preference scores for the collections changing.

In some embodiments, if a visualization or control may be selected for inclusion in the composition dashboard, the visualization or control may be placed in a default position in the composition dashboard and with a default size. For example, in some embodiments, the first selected visualization may be automatically placed in the upper left corner of the composition, the second selected visualization may be placed adjacent the first selected visualization, and so on. Note, in some embodiments, dashboard engines may be arranged to vary the default placing or positioning depending on the type of visualization, or the like.

Accordingly, in some embodiments, dashboard engines may be arranged to enable dashboard authors to re-position or resize the one or more visualizations or one or more controls after their initial placements.

At block 1206, in one or more of the various embodiments, optionally, dashboard engines may be arranged to update the collection preference scores associated with one or more collections.

In one or more of the various embodiments, dashboard engines may be arranged to infer one or more preference changes based on the re-positioning or re-sizing of the one or more visualizations or controls. For example, in some embodiments, if a visualization is enlarged or placed in a more prominent location in the composition dashboard, the dashboard engine may infer that the visualization may be of interest to the dashboard author.

In one or more of the various embodiments, dashboard engines may be arranged to update the weight or interest score of one or more attributes associated with the visualization that may be repositioned or resized. Also, in some embodiments, dashboard engines may be arranged to update the weight of interest scores of visualization types that may be repositioned or resized.

For example, in some embodiments, dashboard engines may be arranged to infer an increased user preference if a visualization is the only visualization in the top row of the composition dashboard. Likewise, for example, an increased preference may be inferred if a visualization enlarged relative to other visualizations in the composition dashboard. Further, in some embodiments, dashboard engines may be arranged to enable dashboard authors to explicitly set preferences for one or more visualizations. For example, in some embodiments, dashboard engines may be arranged to provide user interface controls that enable dashboard authors to explicitly indicate an increased preference or decreased preference for one or more visualizations.

Note, this block is indicated as being optional because in some embodiments the updating the preference scores of collections may be deferred until requested or initiated by the dashboard author.

At block 1208, in one or more of the various embodiments, optionally, dashboard engines may be arranged to re-rank the one or more collections based on the updated interest scores. In one or more of the various embodiments, if the repositioned or resized visualizations may be determined to result in changes in author preference or author interest, dashboard engines may be arranged to re-rank the collections.

Also, in some embodiments, dashboard engines may be arranged to infer an updated author intent or sub-intent based on the repositioning or resizing of the visualizations. Accordingly, in some embodiments, one or more intents or sub-intents may be emphasized or emphasized depending on the repositioned or resized visualizations.

In some embodiments, the rules for determining increased preference or decreased preference in response to repositioning or resizing visualizations may vary depending on the type of visualization, local requirements, local preferences, or the like. Accordingly, in some embodiments, dashboard engines may be arranged to determine such rules or instructions based on configuration information to account for local requirements or local circumstances. Likewise, as different types of visualization may be introduced to the visualization platforms, the rules may be updated as necessary.

Note, this block is indicated as being optional because in some embodiments the re-ranking of collections may be deferred until requested or initiated by the dashboard author.

At block 1210, in one or more of the various embodiments, optionally, dashboard engines may be arranged to display the re-ranked collections.

Note, this block is indicated as being optional because in some embodiments the display of the re-ranked (re-sorted) collections may be deferred until requested or initiated by the dashboard author.

Next, in one or more of the various embodiments, control may be returned to a calling process It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Operating Environment

Figure 13:
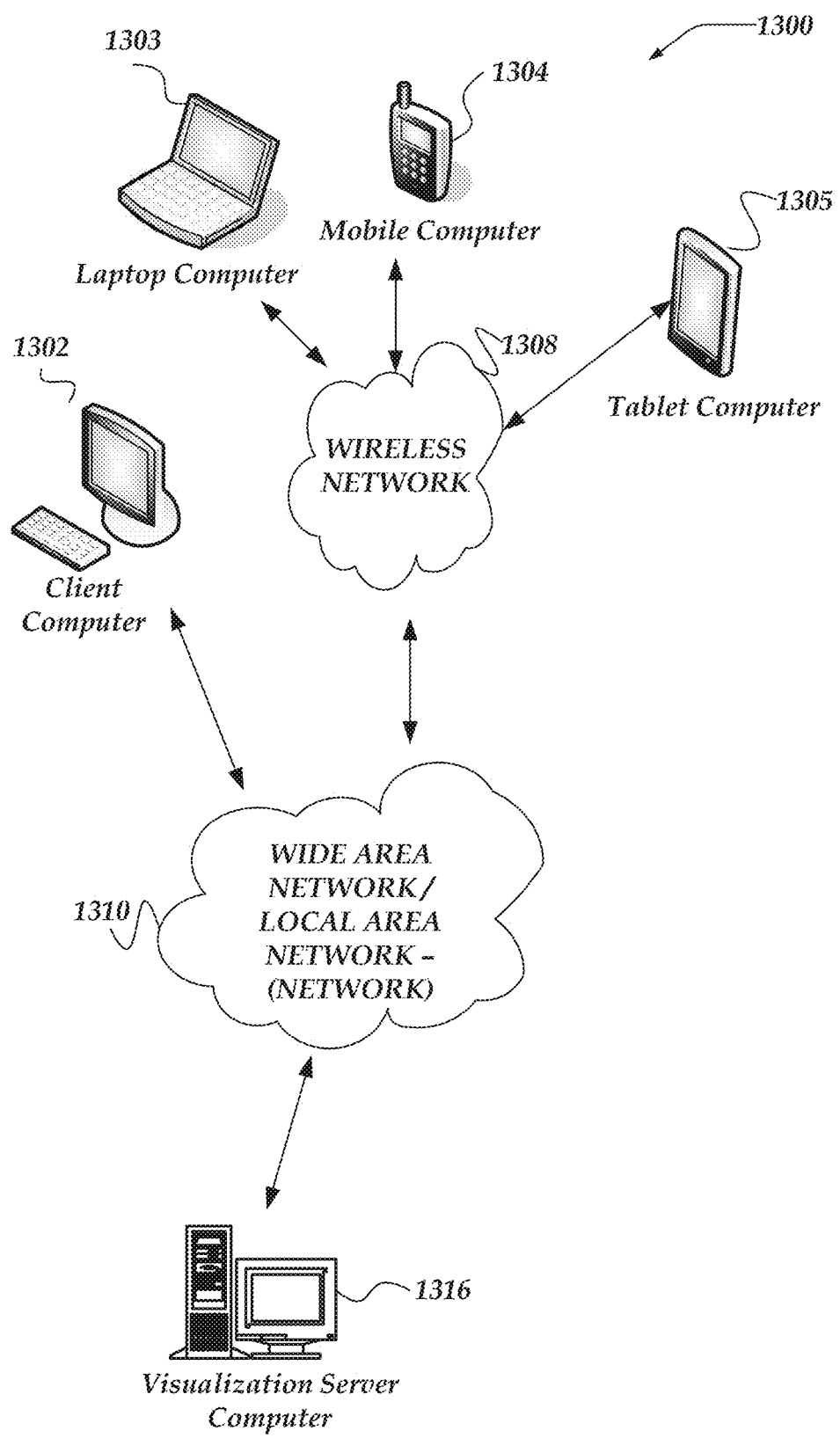
FIG. 13 shows components of one embodiment of an environment in which embodiments of these innovations may be practiced.

FIG. 13 shows components of one embodiment of an environment in which embodiments of these innovations may be practiced. Not all of the components may be required to practice the invention, and variations in the arrangement and type of the components may be made without departing from the spirit or scope of the invention. As shown, system 1300 of FIG. 13 includes local area networks (LANs)/wide area networks (WANs)—(network) 1310, wireless network 1308, client computers 1302-1305, visualization server computer 1316, or the like.

At least one embodiment of client computers 1302-1305 is described in more detail below in conjunction with FIG. 2. In one embodiment, at least some of client computers 1302-1305 may operate over one or more wired or wireless networks, such as networks 1308, or 1310. Generally, client computers 1302-1305 may include virtually any computer capable of communicating over a network to send and receive information, perform various online activities, offline actions, or the like. In one embodiment, one or more of client computers 1302-1305 may be configured to operate within a business or other entity to perform a variety of services for the business or other entity. For example, client computers 1302-1305 may be configured to operate as a web server, firewall, client application, media player, mobile telephone, game console, desktop computer, or the like. However, client computers 1302-1305 are not constrained to these services and may also be employed, for example, as for end-user computing in other embodiments. It should be recognized that more or less client computers (as shown in FIG. 13) may be included within a system such as described herein, and embodiments are therefore not constrained by the number or type of client computers employed.

Computers that may operate as client computer 1302 may include computers that typically connect using a wired or wireless communications medium such as personal computers, multiprocessor systems, microprocessor-based or programmable electronic devices, network PCs, or the like. In some embodiments, client computers 1302-1305 may include virtually any portable computer capable of connecting to another computer and receiving information such as, laptop computer 1303, mobile computer 1304, tablet computers 1305, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 1302-1305 typically range widely in terms of capabilities and features. Moreover, client computers 1302-1305 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 1302-1305 also may include at least one other client application that is configured to receive or send content between another computer. The client application may include a capability to send or receive content, or the like. The client application may further provide information that identifies itself, including a type, capability, name, and the like. In one embodiment, client computers 1302-1305 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 1316, or other computers.

Client computers 1302-1305 may further be configured to include a client application that enables an end-user to log into an end-user account that may be managed by another computer, such as visualization server computer 1316, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 1316, or the like.

Wireless network 1308 is configured to couple client computers 1303-1305 and its components with network 1310. Wireless network 1308 may include any of a variety of wireless sub-networks that may further overlay standalone ad-hoc networks, and the like, to provide an infrastructure-oriented connection for client computers 1303-1305. Such sub-networks may include mesh networks, Wireless LAN (WLAN) networks, cellular networks, and the like. In one embodiment, the system may include more than one wireless network.

Wireless network 1308 may further include an autonomous system of terminals, gateways, routers, and the like connected by wireless radio links, and the like. These connectors may be configured to move freely and randomly and organize themselves arbitrarily, such that the topology of wireless network 1308 may change rapidly.

Wireless network 1308 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 1303-1305 with various degrees of mobility. In one non-limiting example, wireless network 1308 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 1308 may include virtually any wireless communication mechanism by which information may travel between client computers 1303-1305 and another computer, network, a cloud-based network, a cloud instance, or the like.

Network 1310 is configured to couple network computers with other computers, including, visualization server computer 1316, client computers 1302, and client computers 1303-1305 through wireless network 1308, or the like. Network 1310 is enabled to employ any form of computer readable media for communicating information from one electronic device to another. Also, network 1310 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 1310 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 1316 is described in more detail below in conjunction with FIG. 15. Although FIG. 13 illustrates visualization server computer 1316 or the like, as a single computer, the innovations or embodiments are not so limited. For example, one or more functions of visualization server computer 1316, or the like, may be distributed across one or more distinct network computers. Moreover, in one or more embodiments, visualization server computer 1316 may be implemented using a plurality of network computers. Further, in one or more of the various embodiments, visualization server computer 1316, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 14:
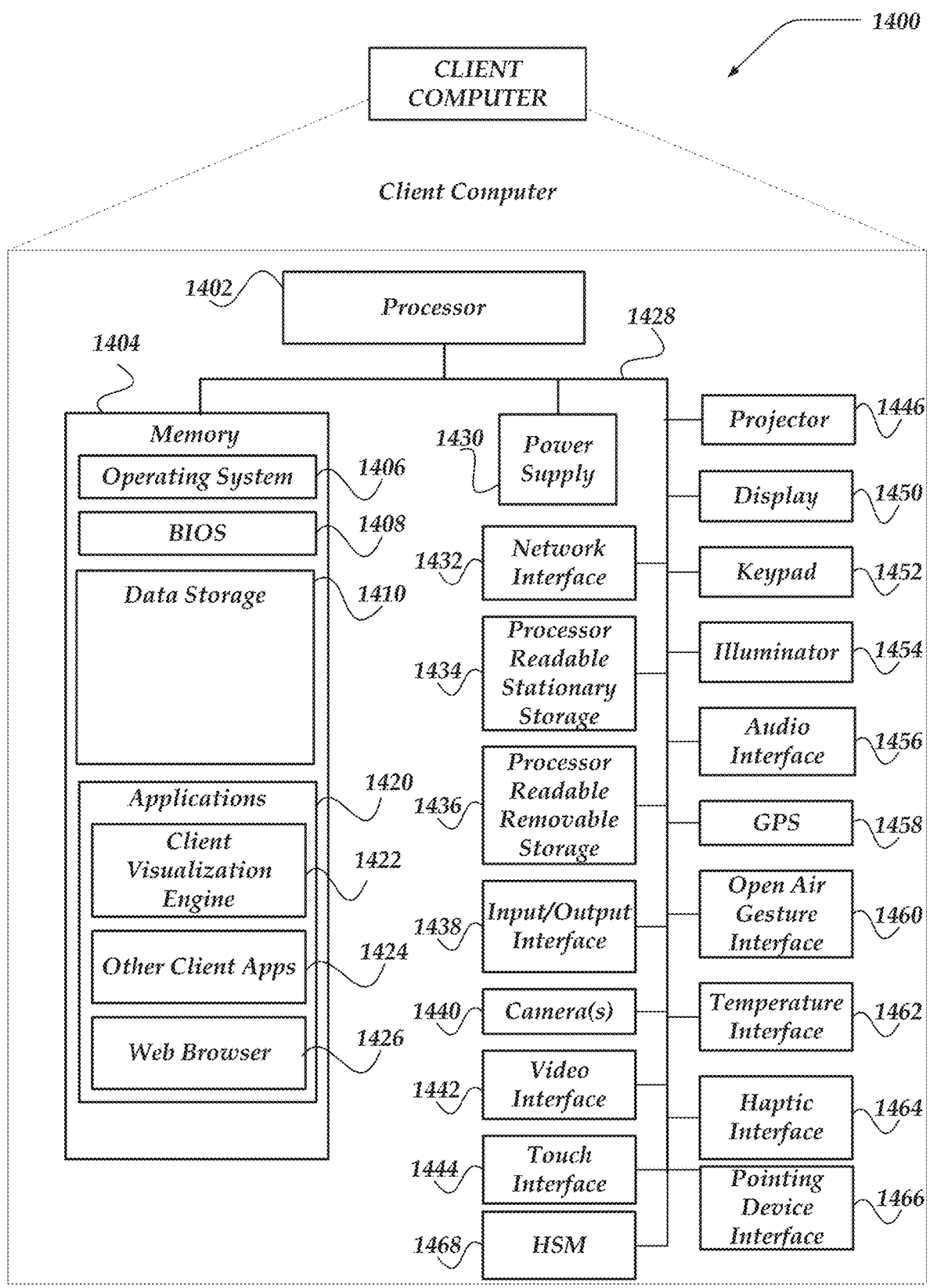
FIG. 14 shows one embodiment of a client computer that may include many more or less components than those shown.

FIG. 14 shows one embodiment of client computer 1400 that may include many more or less components than those shown. Client computer 1400 may represent, for example, one or more embodiment of mobile computers or client computers shown in FIG. 13.

Client computer 1400 may include processor 1402 in communication with memory 1404 via bus 1428. Client computer 1400 may also include power supply 1430, network interface 1432, audio interface 1456, display 1450, keypad 1452, illuminator 1454, video interface 1442, input/output interface 1438, haptic interface 1464, global positioning systems (GPS) receiver 1458, open air gesture interface 1460, temperature interface 1462, camera(s) 1440, projector 1446, pointing device interface 1466, processor-readable stationary storage device 1434, and processor-readable removable storage device 1436. Client computer 1400 may optionally communicate with a base station (not shown), or directly with another computer. And in one embodiment, although not shown, a gyroscope may be employed within client computer 1400 to measuring or maintaining an orientation of client computer 1400.

Power supply 1430 may provide power to client computer 1400. A rechargeable or non-rechargeable battery may be used to provide power. The power may also be provided by an external power source, such as an AC adapter or a powered docking cradle that supplements or recharges the battery.

Network interface 1432 includes circuitry for coupling client computer 1400 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1432 is sometimes known as a transceiver, transceiving device, or network interface card (MC).

Audio interface 1456 may be arranged to produce and receive audio signals such as the sound of a human voice. For example, audio interface 1456 may be coupled to a speaker and microphone (not shown) to enable telecommunication with others or generate an audio acknowledgment for some action. A microphone in audio interface 1456 can also be used for input to or control of client computer 1400, e.g., using voice recognition, detecting touch based on sound, and the like.

Display 1450 may be a liquid crystal display (LCD), gas plasma, electronic ink, light emitting diode (LED), Organic LED (OLED) or any other type of light reflective or light transmissive display that can be used with a computer. Display 1450 may also include a touch interface 1444 arranged to receive input from an object such as a stylus or a digit from a human hand, and may use resistive, capacitive, surface acoustic wave (SAW), infrared, radar, or other technologies to sense touch or gestures.

Projector 1446 may be a remote handheld projector or an integrated projector that is capable of projecting an image on a remote wall or any other reflective object such as a remote screen.

Video interface 1442 may be arranged to capture video images, such as a still photo, a video segment, an infrared video, or the like. For example, video interface 1442 may be coupled to a digital video camera, a web-camera, or the like. Video interface 1442 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1452 may comprise any input device arranged to receive input from a user. For example, keypad 1452 may include a push button numeric dial, or a keyboard. Keypad 1452 may also include command buttons that are associated with selecting and sending images.

Illuminator 1454 may provide a status indication or provide light. Illuminator 1454 may remain active for specific periods of time or in response to event messages. For example, when illuminator 1454 is active, it may back-light the buttons on keypad 1452 and stay on while the client computer is powered. Also, illuminator 1454 may back-light these buttons in various patterns when particular actions are performed, such as dialing another client computer. Illuminator 1454 may also cause light sources positioned within a transparent or translucent case of the client computer to illuminate in response to actions.

Further, client computer 1400 may also comprise hardware security module (HSM) 1468 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1468 may be a stand-alone computer, in other cases, HSM 1468 may be arranged as a hardware card that may be added to a client computer.

Client computer 1400 may also comprise input/output interface 1438 for communicating with external peripheral devices or other computers such as other client computers and network computers. The peripheral devices may include an audio headset, virtual reality headsets, display screen glasses, remote speaker system, remote speaker and microphone system, and the like. Input/output interface 1438 can utilize one or more technologies, such as Universal Serial Bus (USB), Infrared, WiFi, WiMax, Bluetooth™, and the like.

Input/output interface 1438 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 1400.

Haptic interface 1464 may be arranged to provide tactile feedback to a user of the client computer. For example, the haptic interface 1464 may be employed to vibrate client computer 1400 in a particular way when another user of a computer is calling. Temperature interface 1462 may be used to provide a temperature measurement input or a temperature changing output to a user of client computer 1400. Open air gesture interface 1460 may sense physical gestures of a user of client computer 1400, for example, by using single or stereo video cameras, radar, a gyroscopic sensor inside a computer held or worn by the user, or the like. Camera 1440 may be used to track physical eye movements of a user of client computer 1400.

GPS transceiver 1458 can determine the physical coordinates of client computer 1400 on the surface of the Earth, which typically outputs a location as latitude and longitude values. GPS transceiver 1458 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 1400 on the surface of the Earth. It is understood that under different conditions, GPS transceiver 1458 can determine a physical location for client computer 1400. In one or more embodiments, however, client computer 1400 may, through other components, provide other information that may be employed to determine a physical location of the client computer, including for example, a Media Access Control (MAC) address, IP address, and the like.

In at least one of the various embodiments, applications, such as, operating system 1406, visualization client 1422, other client apps 1424, web browser 1426, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 1458. Also, in some embodiments, geolocation information may include information provided using one or more geolocation protocols over the networks, such as, wireless network 1308 or network 1310.

Human interface components can be peripheral devices that are physically separate from client computer 1400, allowing for remote input or output to client computer 1400. For example, information routed as described here through human interface components such as display 1450 or keyboard 1452 can instead be routed through network interface 1432 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 1426 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 1404 may include RAM, ROM, or other types of memory. Memory 1404 illustrates an example of computer-readable storage media (devices) for storage of information such as computer-readable instructions, data structures, program modules or other data. Memory 1404 may store BIOS 1408 for controlling low-level operation of client computer 1400. The memory may also store operating system 1406 for controlling the operation of client computer 1400. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 1404 may further include one or more data storage 1410, which can be utilized by client computer 1400 to store, among other things, applications 1420 or other data. For example, data storage 1410 may also be employed to store information that describes various capabilities of client computer 1400. The information may then be provided to another device or computer based on any of a variety of methods, including being sent as part of a header during a communication, sent upon request, or the like. Data storage 1410 may also be employed to store social networking information including address books, buddy lists, aliases, user profile information, or the like. Data storage 1410 may further include program code, data, algorithms, and the like, for use by a processor, such as processor 1402 to execute and perform actions. In one embodiment, at least some of data storage 1410 might also be stored on another component of client computer 1400, including, but not limited to, non-transitory processor-readable removable storage device 1436, processor-readable stationary storage device 1434, or even external to the client computer.

Applications 1420 may include computer executable instructions which, when executed by client computer 1400, transmit, receive, or otherwise process instructions and data. Applications 1420 may include, for example, visualization client 1422, other client applications 1424, web browser 1426, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 1400 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 1400 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 15:
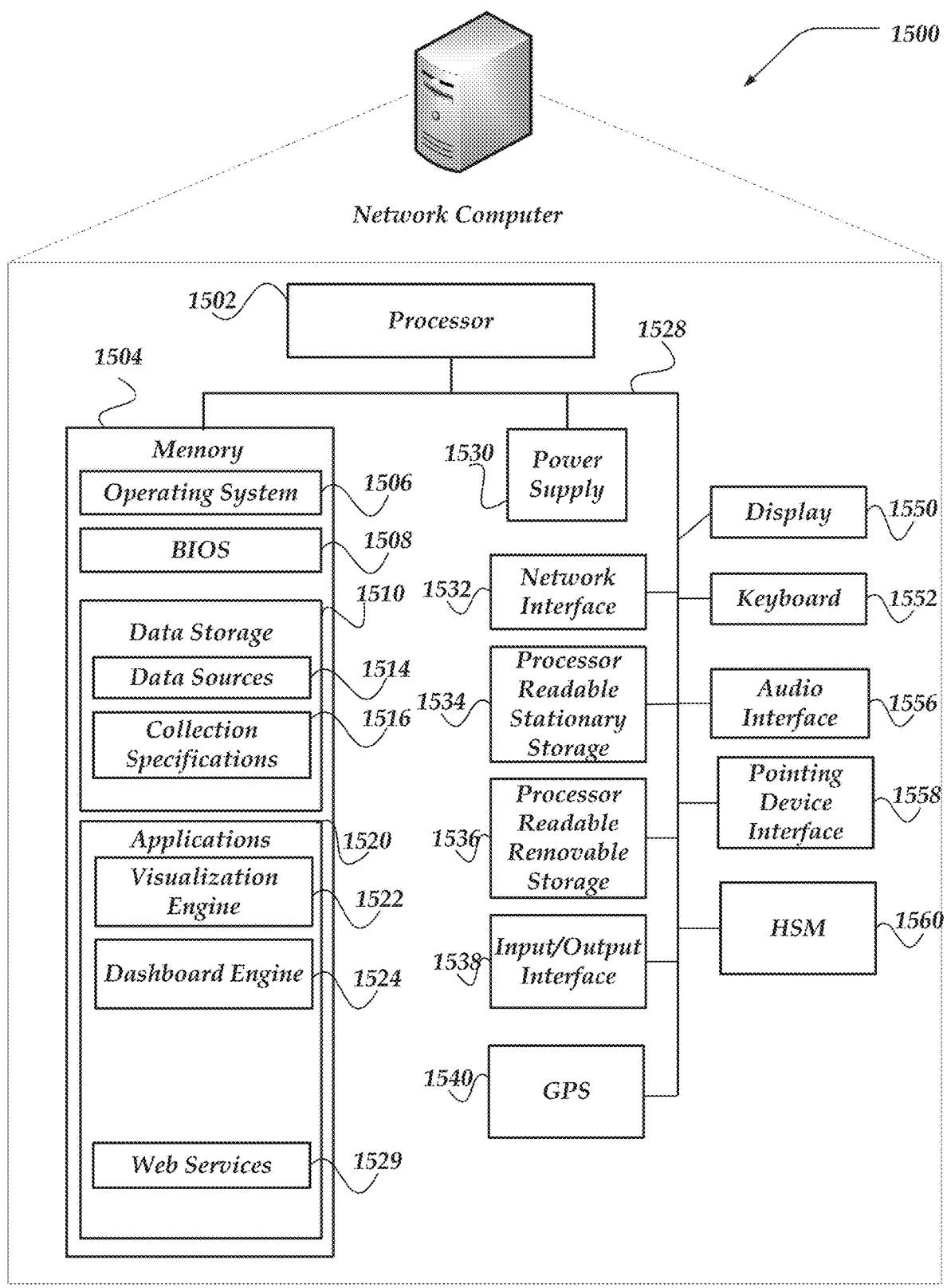
FIG. 15 shows one embodiment of a network computer that may be included in a system implementing one or more of the various embodiments.

FIG. 15 shows one embodiment of network computer 1500 that may be included in a system implementing one or more of the various embodiments. Network computer 1500 may include many more or less components than those shown in FIG. 15. However, the components shown are sufficient to disclose an illustrative embodiment for practicing these innovations. Network computer 1500 may represent, for example, one embodiment of at least one of visualization server computer 1316, or the like, of FIG. 13.

Network computers, such as, network computer 1500 may include a processor 1502 that may be in communication with a memory 1504 via a bus 1528. In some embodiments, processor 1502 may be comprised of one or more hardware processors, or one or more processor cores. In some cases, one or more of the one or more processors may be specialized processors designed to perform one or more specialized actions, such as, those described herein. Network computer 1500 also includes a power supply 1530, network interface 1532, audio interface 1556, display 1550, keyboard 1552, input/output interface 1538, processor-readable stationary storage device 1534, and processor-readable removable storage device 1536. Power supply 1530 provides power to network computer 1500.

Network interface 1532 includes circuitry for coupling network computer 1500 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 1532 is sometimes known as a transceiver, transceiving device, or network interface card (NIC). Network computer 1500 may optionally communicate with a base station (not shown), or directly with another computer.

Audio interface 1556 is arranged to produce and receive audio signals such as the sound of a human voice. For example, audio interface 1556 may be coupled to a speaker and microphone (not shown) to enable telecommunication with others or generate an audio acknowledgment for some action. A microphone in audio interface 1556 can also be used for input to or control of network computer 1500, for example, using voice recognition.

Display 1550 may be a liquid crystal display (LCD), gas plasma, electronic ink, light emitting diode (LED), Organic LED (OLED) or any other type of light reflective or light transmissive display that can be used with a computer. In some embodiments, display 1550 may be a handheld projector or pico projector capable of projecting an image on a wall or other object.

Network computer 1500 may also comprise input/output interface 1538 for communicating with external devices or computers not shown in FIG. 15. Input/output interface 1538 can utilize one or more wired or wireless communication technologies, such as USB™, Firewire™ WiFi, WiMax, Thunderbolt™, Infrared, Bluetooth™, Zigbee™, serial port, parallel port, and the like.

Also, input/output interface 1538 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 1500. Human interface components can be physically separate from network computer 1500, allowing for remote input or output to network computer 1500. For example, information routed as described here through human interface components such as display 1550 or keyboard 1552 can instead be routed through the network interface 1532 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1558 to receive user input.

GPS transceiver 1540 can determine the physical coordinates of network computer 1500 on the surface of the Earth, which typically outputs a location as latitude and longitude values. GPS transceiver 1540 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1500 on the surface of the Earth. It is understood that under different conditions, GPS transceiver 1540 can determine a physical location for network computer 1500. In one or more embodiments, however, network computer 1500 may, through other components, provide other information that may be employed to determine a physical location of the client computer, including for example, a Media Access Control (MAC) address, IP address, and the like.

In at least one of the various embodiments, applications, such as, operating system 1506, visualization engine 1522, dashboard engine 1524, other applications 1529, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 1540. Also, in some embodiments, geolocation information may include information provided using one or more geolocation protocols over the networks, such as, wireless network 1308 or network 1310.

Memory 1504 may include Random Access Memory (RAM), Read-Only Memory (ROM), or other types of memory. Memory 1504 illustrates an example of computer-readable storage media (devices) for storage of information such as computer-readable instructions, data structures, program modules or other data. Memory 1504 stores a basic input/output system (BIOS) 1508 for controlling low-level operation of network computer 1500. The memory also stores an operating system 1506 for controlling the operation of network computer 1500. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 1504 may further include one or more data storage 1510, which can be utilized by network computer 1500 to store, among other things, applications 1520 or other data. For example, data storage 1510 may also be employed to store information that describes various capabilities of network computer 1500. The information may then be provided to another device or computer based on any of a variety of methods, including being sent as part of a header during a communication, sent upon request, or the like. Data storage 1510 may also be employed to store social networking information including address books, buddy lists, aliases, user profile information, or the like. Data storage 1510 may further include program code, data, algorithms, and the like, for use by a processor, such as processor 1502 to execute and perform actions such as those actions described below. In one embodiment, at least some of data storage 1510 might also be stored on another component of network computer 1500, including, but not limited to, non-transitory media inside processor-readable removable storage device 1536, processor-readable stationary storage device 1534, or any other computer-readable storage device within network computer 1500, or even external to network computer 1500. Data storage 1510 may include, for example, data sources 1514, collection specifications 1516, or the like.

Applications 1520 may include computer executable instructions which, when executed by network computer 1500, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1520 may include visualization engine 1522, dashboard engine 1524, other applications 1529, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, visualization engine 1522, dashboard engine 1524, other applications 1529, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to visualization engine 1522, dashboard engine 1524, or the like, may be provisioned and de-commissioned automatically.

Also, in one or more of the various embodiments, visualization engine 1522, dashboard engine 1524, other applications 1529, or the like, may be located in virtual servers running in a cloud-based computing environment rather than being tied to one or more specific physical network computers.

Further, network computer 1500 may also comprise hardware security module (HSM) 1560 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1560 may be a stand-alone network computer, in other cases, HSM 1560 may be arranged as a hardware card that may be installed in a network computer.

Additionally, in one or more embodiments (not shown in the figures), network computer 1500 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

What is claimed as new and desired by Letters Patent of the United States is:

1. A method for generating collection of data visualization for dashboard composition, comprising:
    at a computer system having a display generation component, one or more processors, and memory storing one or more programs, wherein the one or more programs are configured to be executed by the one or more processors, the one or more programs including instructions for:
        determining a respective type of analysis from a plurality of predetermined types of analysis based on one or more user-selected data fields from a data source;
        based on the respective type of analysis, selecting one or more collections of data visualizations from a plurality of candidate collections of data visualizations that are associated with the respective type of analysis, wherein each collection of the one or more collections includes (i) at least one data visualization generated based on an additional data field other than the one or more user-selected data fields that is remaining in the data source and (ii) at least one data visualization generated based on at least one of the one or more user-selected data fields; and
        displaying, in a user interface, via the display generation component, the one or more collections of data visualizations, wherein one or more data visualizations in a respective collection of the one or more collections are selectable for dashboard composition;
        detecting a user input selecting a data visualization of the one or more data visualizations in the respective collection of the one or more collections; and
        in response to the user input selecting the data visualization, adding the selected data visualization to a dashboard of at least one visualization, wherein the dashboard is displayed in a user interface via display generation component.

2. The method of claim 1, wherein:
    each of the one or more user-selected data fields is selected from a plurality of data fields in the data source; and each of the plurality of data fields in the data source includes a respective type, including a quantitative measure, a categorical field, a temporal field, or a geographic field.

3. The method of claim 2, comprising:
determining a sub-intent of a plurality of sub-intents of the respective type of analysis based on respective types of the user-selected data fields, wherein each sub-intent is based on a combination of types of data attributes; and
determining the one or more collections of data visualizations includes ranking the plurality of candidate collections based on the sub-intent.

4. The method of claim 3, wherein:
the plurality of candidate collections are associated with respective scores;
the respective scores are based on the one or more user-selected data fields, the respective type of analysis, or a respective sub-intent; and
the one or more collections of data visualizations are selected from the plurality of candidate collections of data visualizations based on the respective scores.

5. The method of claim 3, wherein:
data visualizations in a respective collection of the one or more collections of data visualizations are associated with respective scores;
the respective scores are based on the one or more user-selected data fields, the respective type of analysis, or a respective sub-intent; and
the data visualizations in the respective collection are selected based on the respective scores.

6. The method of claim 1, further comprising:
receiving a user selection of a subset of the one or more data visualizations in the respective collection of the one or more collections; and
displaying the subset of the one or more data visualizations in a dashboard that is being composed in a dashboard composition panel.

7. The method of claim 6, further comprising:
updating respective ranking of the plurality of candidate collections of data visualizations based on the user selection of the subset of the one or more data visualizations in the respective collection of the one or more collections.

8. The method of claim 6, further comprising:
updating respective ranking of the one or more data visualizations in the respective collection of the one or more collections based on the user selection of the subset of the one or more data visualizations in the respective collection of the one or more collections.

9. The method of claim 1, wherein the additional data field other than the one or more user-selected data fields is determined based on statistical analysis of the additional data field meeting a variance threshold.

10. The method of claim 1, further comprising:
generating respective score for the plurality of candidate collections based on respective types of the user-selected data fields and the respective type of analysis, wherein the one or more collections of data visualizations are selected from the plurality of candidate collections of data visualizations based on the respective scores.

11. A non-transitory computer readable storage medium storing one or more programs, the one or more programs comprising instructions, which when executed by a computer system with a display generation component, and a touch-sensitive surface, cause the computer system to:
determine a respective type of analysis from a plurality of predetermined types of analysis based on one or more user-selected data fields from a data source;
based on the respective type of analysis, select one or more collections of data visualizations from a plurality of candidate collections of data visualizations that are associated with the respective type of analysis, wherein each collection of the one or more collections includes (i) at least one data visualization generated based on an additional data field other than the one or more user-selected data fields that is remaining in the data source and (ii) at least one data visualization generated based on at least one of the one or more user-selected data fields; and
display, in a user interface, via the display generation component, the one or more collections of data visualizations, wherein one or more data visualizations in a respective collection of the one or more collections are selectable for dashboard composition;
detect a user input selecting a data visualization of the one or more data visualizations in the respective collection of the one or more collections; and
in response to the user input selecting the data visualization, add the selected data visualization to a dashboard of at least one visualization, wherein the dashboard is displayed in a user interface via display generation component.

12. The non-transitory computer readable storage medium of claim 11, wherein:
each of the one or more user-selected data fields is selected from a plurality of data fields in the data source; and
each of the plurality of data fields in the data source includes a respective type, including a quantitative measure, a categorical field, a temporal field, or a geographic field.

13. The non-transitory computer readable storage medium of claim 12, wherein the one or more programs include instructions that, when executed by the computer system, cause the computer system to:
determine a sub-intent of a plurality of sub-intents of the respective type of analysis based on respective types of the user-selected data fields, wherein each sub-intent is based on a combination of types of data attributes; and
determine the one or more collections of data visualizations includes ranking the plurality of candidate collections based on the sub-intent.

14. The non-transitory computer readable storage medium of claim 13, wherein:
the plurality of candidate collections are associated with respective scores;
the respective scores are based on the one or more user-selected data fields, the respective type of analysis, or a respective sub-intent; and
the one or more collections of data visualizations are selected from the plurality of candidate collections of data visualizations based on the respective scores.

15. The non-transitory computer readable storage medium of claim 13, wherein:
data visualizations in a respective collection of the one or more collections of data visualizations are associated with respective scores;
the respective scores are based on the one or more user-selected data fields, the respective type of analysis, or a respective sub-intent; and
the data visualizations in the respective collection are selected based on the respective scores.

16. The non-transitory computer readable storage medium of claim 11, wherein the one or more programs include instructions that, when executed by the computer system, cause the computer system to:
  receive a user selection of a subset of the one or more data visualizations in the respective collection of the one or more collections; and
  display the subset of the one or more data visualizations in a dashboard that is being composed in a dashboard composition panel.

17. The non-transitory computer readable storage medium of claim 16, wherein the one or more programs include instructions that, when executed by the computer system, cause the computer system to:
  update respective ranking of the plurality of candidate collections of data visualizations based on the user selection of the subset of the one or more data visualizations in the respective collection of the one or more collections.

18. The non-transitory computer readable storage medium of claim 16, wherein the one or more programs include instructions that, when executed by the computer system, cause the computer system to:
  update respective ranking of the one or more data visualizations in the respective collection of the one or more collections based on the user selection of the subset of the one or more data visualizations in the respective collection of the one or more collections.

19. The non-transitory computer readable storage medium of claim 11, wherein the one or more programs include instructions that, when executed by the computer system, cause the computer system to:
  generate respective score for the plurality of candidate collections based on respective types of the user-selected data fields and the respective type of analysis, wherein the one or more collections of data visualizations are selected from the plurality of candidate collections of data visualizations based on the respective scores.

20. A computer system for generating data visualizations, comprising:
  a display generation component;
  one or more processors; and
  memory;
  wherein the memory stores one or more programs configured for execution by the one or more processors, and the one or more programs comprising instructions for:
  determining a respective type of analysis from a plurality of predetermined types of analysis based on one or more user-selected data fields from a data source;
  based on the respective type of analysis, selecting one or more collections of data visualizations from a plurality of candidate collections of data visualizations that are associated with the respective type of analysis, wherein each collection of the one or more collections includes (i) at least one data visualization generated based on an additional data field other than the one or more user-selected data fields that is remaining in the data source and (ii) at least one data visualization generated based on at least one of the one or more user-selected data fields; and
  displaying, in a user interface, via the display generation component, the one or more collections of data visualizations, wherein one or more data visualizations in a respective collection of the one or more collections are selectable for dashboard composition;
  detecting a user input selecting a data visualization of the one or more data visualizations in the respective collection of the one or more collections; and
  in response to the user input selecting the data visualization, adding the selected data visualization to a dashboard of at least one visualization, wherein the dashboard is displayed in a user interface via display generation component.

* * * * *